US009728995B2

(12) United States Patent
Matsumura et al.

(10) Patent No.: US 9,728,995 B2
(45) Date of Patent: Aug. 8, 2017

(54) SYSTEMS, METHODS AND DEVICES FOR ADAPTABLE BATTERY CHARGING

(71) Applicant: Intel Corporation, Santa Clara, CA (US)

(72) Inventors: Naoki Matsumura, San Jose, CA (US); Gang Ji, Santa Clara, CA (US); Brian C. Fritz, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 103 days.

(21) Appl. No.: 14/681,810

(22) Filed: Apr. 8, 2015

(65) Prior Publication Data

US 2016/0301226 A1  Oct. 13, 2016

(51) Int. Cl.
*H02J 7/00* (2006.01)
*H02J 7/04* (2006.01)

(52) U.S. Cl.
CPC ........... *H02J 7/008* (2013.01); *H02J 7/045* (2013.01); *H02J 2007/0037* (2013.01); *H02J 2007/0062* (2013.01); *H02J 2007/0096* (2013.01)

(58) Field of Classification Search
CPC ......... H02J 7/0031; H02J 7/0052; H02J 7/007
USPC ................................................ 320/107, 128
See application file for complete search history.

(56) References Cited

U.S. PATENT DOCUMENTS

| | | | | | |
|---|---|---|---|---|---|
| 5,488,284 | A | * | 1/1996 | Dias | H02J 7/0036 320/162 |
| 5,541,490 | A | * | 7/1996 | Sengupta | G01R 31/3624 320/160 |
| 5,672,953 | A | * | 9/1997 | Kim | H02J 7/008 320/163 |
| 6,137,280 | A | * | 10/2000 | Ackermann | H02J 7/0008 323/224 |
| 6,331,762 | B1 | * | 12/2001 | Bertness | G01R 31/3627 320/134 |
| 6,832,171 | B2 | * | 12/2004 | Barsoukov | G01R 31/3662 320/132 |
| 7,545,109 | B2 | * | 6/2009 | Salman | B60L 3/12 318/139 |
| 7,586,292 | B1 | | 9/2009 | Wakefield et al. | |

(Continued)

OTHER PUBLICATIONS

PCT/US2016/018197, International Search Report and Written Opinion, May 27, 2016, 10 pages.

*Primary Examiner* — M'Baye Diao
(74) *Attorney, Agent, or Firm* — Stoel Rives LLP

(57) ABSTRACT

Because a rechargeable battery has an increased number of uses (e.g., cycles), the battery's internal impedance can increase and the efficiency of the battery can become degraded. This internal resistance can cause cutoff voltage thresholds and cutoff current thresholds to prematurely stop a phase of battery charging, as these cutoff values can be based on low-cycle count batteries. New cutoff values can, instead, be based on battery impedance. Use of an adjusted cutoff current threshold during a constant voltage cycle can increase the capacity of high-cycle count batteries. Use of an adjusted cutoff voltage threshold in step charging can increase the charging speed of high-cycle count batteries. These increases in efficiency by using adjusted cutoff values can increase as the battery is further high-cycle count, in comparison with low-cycle count cutoff values used with high-cycle count batteries.

15 Claims, 15 Drawing Sheets

(56) References Cited

U.S. PATENT DOCUMENTS

| | | | | |
|---|---|---|---|---|
| 8,078,416 | B2* | 12/2011 | Iwane | G01R 31/362 |
| | | | | 702/127 |
| 8,509,975 | B2* | 8/2013 | Izumi | B60K 6/28 |
| | | | | 320/150 |
| 8,866,444 | B2* | 10/2014 | Stewart | G01R 31/025 |
| | | | | 320/134 |
| 9,121,910 | B2* | 9/2015 | Maluf | G01R 31/3637 |
| 2011/0077879 | A1* | 3/2011 | Paryani | G01R 31/3662 |
| | | | | 702/63 |
| 2012/0105009 | A1* | 5/2012 | Yao | G01R 31/3662 |
| | | | | 320/134 |
| 2013/0041607 | A1* | 2/2013 | Zimmerman | G01R 19/16542 |
| | | | | 702/63 |
| 2013/0314042 | A1 | 11/2013 | Boehm et al. | |
| 2014/0021959 | A1 | 1/2014 | Maluf et al. | |
| 2014/0084851 | A1 | 3/2014 | Park et al. | |
| 2014/0084939 | A1 | 3/2014 | Sejima et al. | |
| 2014/0320089 | A1 | 10/2014 | Wang et al. | |
| 2015/0231985 | A1* | 8/2015 | Li | B60L 11/1862 |
| | | | | 320/134 |
| 2015/0380953 | A1* | 12/2015 | Keates | H02J 7/0052 |
| | | | | 320/162 |

\* cited by examiner

SYSTEMS, METHODS AND DEVICES FOR ADAPTABLE BATTERY CHARGING

TECHNICAL FIELD

The present disclosure relates to battery charging and more specifically to modifying charging profiles for batteries to accommodate battery changes due to charging cycles.

DETAILED DESCRIPTION OF PREFERRED EMBODIMENTS

Figure 1:
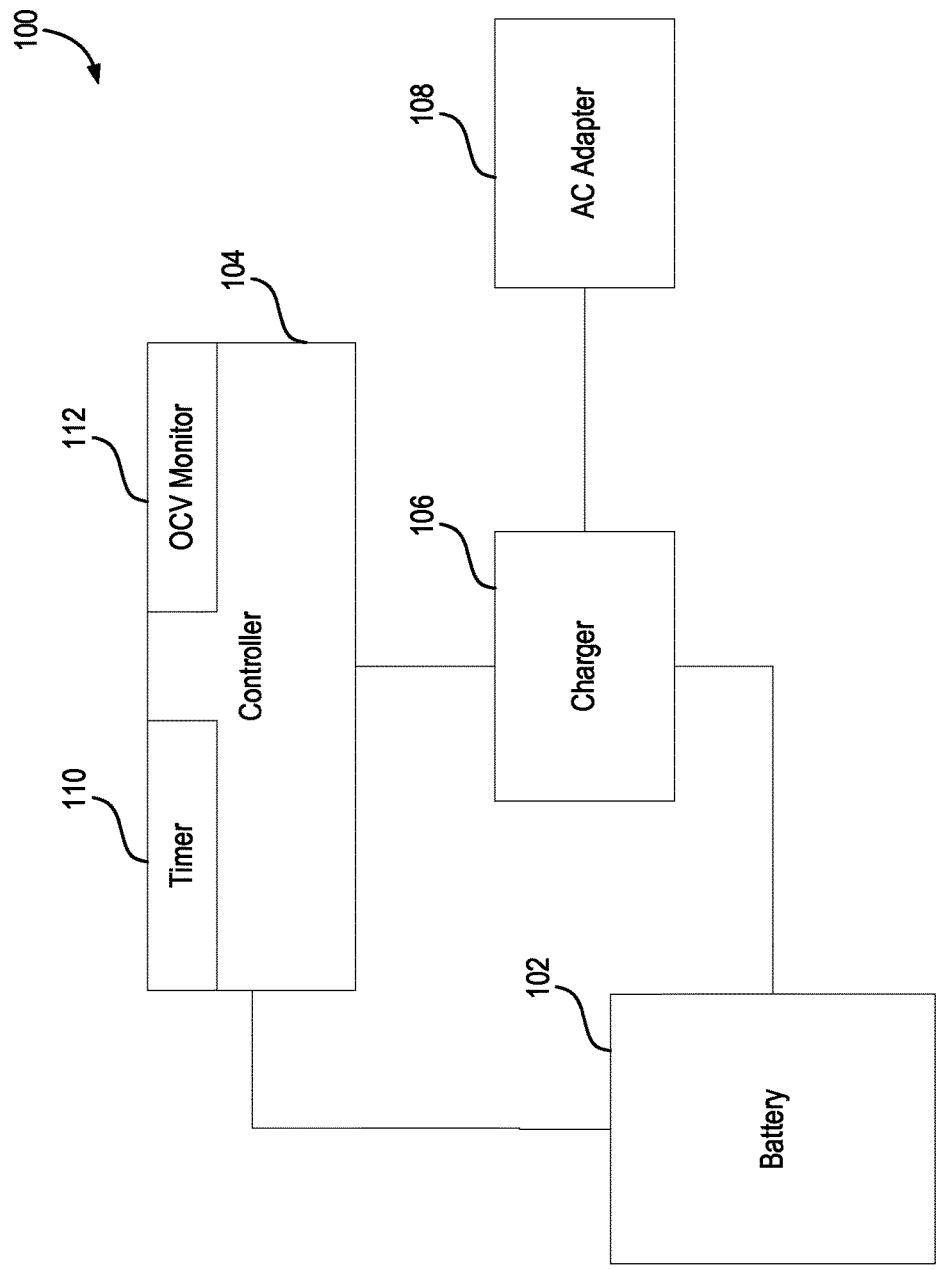
FIG. 1 is a diagram illustrating a charging system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable adaptable charging of batteries during their lifecycle. In one embodiment, a battery is charged more under constant voltage (CV) to account for charging cycles, allowing the battery to have an increased capacity than if longer charging under CV were not performed. In another embodiment, a cutoff voltage threshold in a step charge using constant current (CC) is modified to account for battery changes due to charging cycles. In one embodiment, a cutoff voltage threshold can be managed by a battery controller over a system management bus (SMBUS) to account for dynamic step charging of a battery.

Because a rechargeable battery has an increased number of uses (e.g., cycles), the battery's internal impedance can increase and the efficiency of the battery can become degraded. This internal resistance can cause cutoff voltage thresholds and cutoff current thresholds to prematurely stop a phase of battery charging, as these cutoff values can be based on low-cycle count batteries. New cutoff values can, instead, be based on battery impedance and calculated based upon the open circuit voltage threshold modified based upon current flowing and impedance of the battery. Use of an adjusted cutoff current threshold during a constant voltage cycle can increase the capacity of high-cycle count batteries. Use of an adjusted cutoff voltage threshold in step charging can increase the charging speed of high-cycle count batteries. These increases in efficiency by using adjusted cutoff values can increase as the battery is further high-cycle count, in comparison with low-cycle count cutoff values used with high-cycle count batteries.

In some embodiments, an impedance of a battery can be altered (or degraded) by other conditions as compared with a room-temperature undegraded (or fresh) battery. For example, a cold battery can have a larger impedance than a room-temperature battery. Similar to a high-cycle count battery, cutoff values can, instead, be based on battery impedance and calculated using OCV measurements. Use of an adjusted cutoff current threshold during a CV cycle can increase the capacity of cold batteries during charging. Use of an adjusted cutoff voltage threshold during a CC step charge cycle can decrease battery charge time (i.e. charge faster).

While OCV is sometimes described herein as measured, it should be recognized that OCV can also be estimated based on other measurements or even inferred (such as by the passage of time during a charging cycle). The estimation can be based on charging time, current charging voltage or other measurements and/or inferences. When OCV is described as measured, it should be recognized that another embodiment can use estimated OCV in place of measured OCV.

Figure 2:
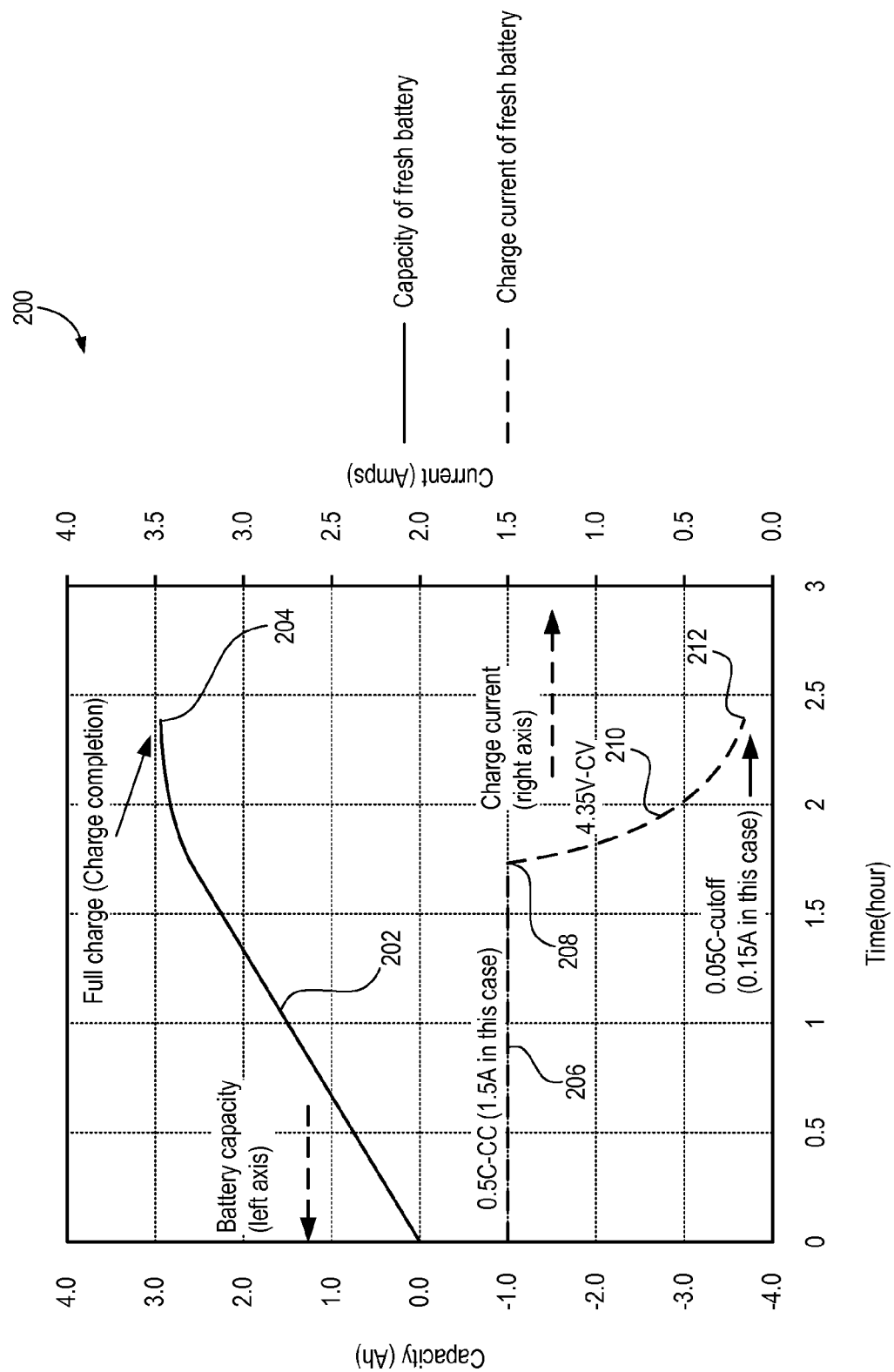
FIG. 2 is a graph illustrating a charging cycle of a low-cycle count battery consistent with embodiments disclosed herein.
Figure 3:
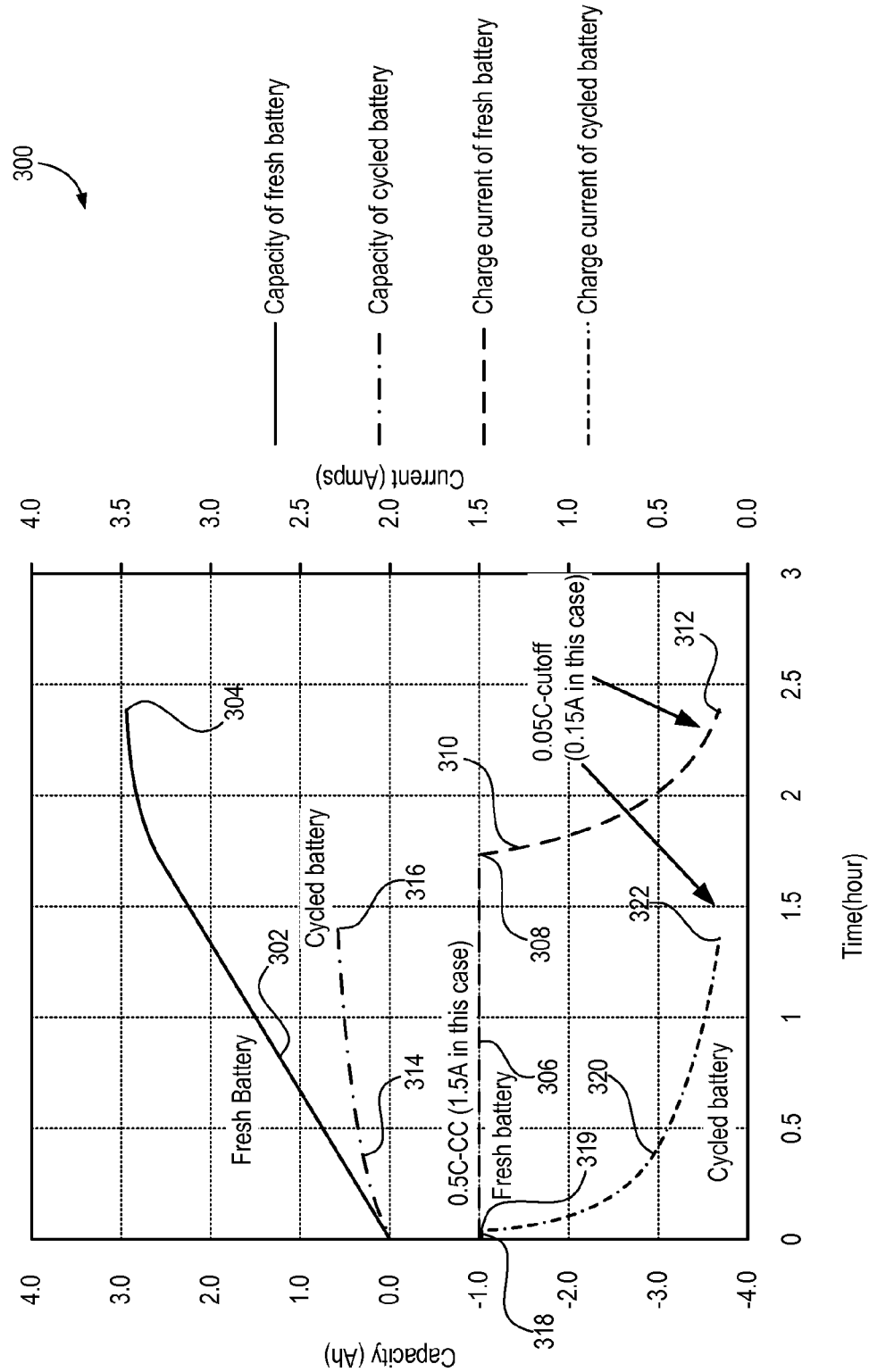
FIG. 3 is a graph illustrating a charging cycle comparison of a low-cycle count battery and a high-cycle battery consistent with embodiments disclosed herein.
Figure 4:
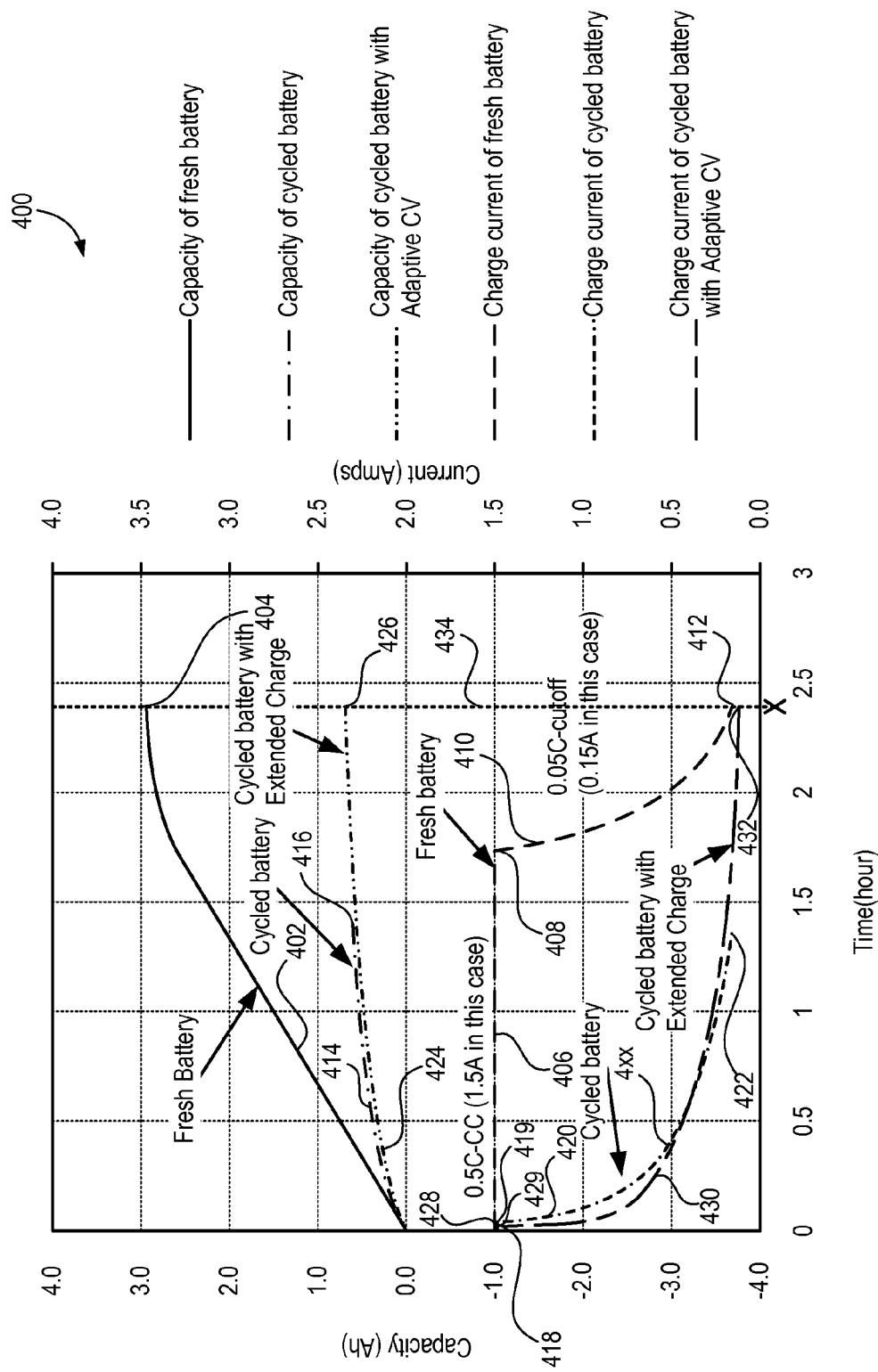
FIG. 4 is a graph illustrating a charging cycle comparison of a low-cycle count battery, a high-cycle battery and a high-cycle battery with a modified cycle consistent with embodiments disclosed herein.

FIGS. 1 to 4 are used to describe a charging system than can be used for modifying a cutoff voltage threshold to increase the charge time or match a desired OCV. FIG. 1 shows the system. FIGS. 2 to 4 show graphs that describe the charging parameters of the system with and without enhancements. FIG. 2 shows a graph that describes a charging process using CC with a cutoff voltage threshold followed by CV with a cutoff current threshold using an undegraded (e.g., fresh or low-cycle count room-temperature battery). FIG. 3 shows a graph that compares the charging process of FIG. 2 with a degraded (e.g., high-cycle or cold) battery using the same settings as the undegraded battery. FIG. 4 shows a graph that compares the charging processes of FIGS. 2 and 3 by modifying the cutoff current threshold for a degraded battery.

FIG. 1 shows a charging system 100 than can be used for modifying a cutoff voltage threshold to increase the charge time or match a desired OCV. The system includes a battery 102, controller 104, charger 106 and alternating current (AC) adapter 108. The system 100 can be used to charge a battery 102 that can be used in devices such as a portable computer, cell phone, tablet or drone. The system 100 can be integrated, such as in a system on a chip (SOC) with an integrated charger or a power management integrated circuit (PMIC) with an integrated charger. The system 100 can also be split, such as between a charging system and battery system. The system 100 can also be discrete with each component residing separately.

The controller 104 can measure, calculate and/or receive information about the battery 102 (e.g., OCV, impedance, percent charged, stored power) and charger (e.g., voltage to the battery 102, current to the battery 102, power provided to the battery 102). The controller 104 can include a timer 110 to measure charge time. The controller 104 can also include an OCV monitor 112 to measure the OCV of the battery 102. The controller can communicate with and/or control output of the charger 106 that receives power from the AC adaptor 108. The charger 106 can operate in different states, including a CC state with a cutoff voltage threshold and/or a constant voltage state with a cutoff current threshold. In some embodiments, the charger 106 operates in a constant current state, constant voltage state, trickle charge state and/or off state. The controller 104 can monitor thresholds (e.g., CC threshold or CV threshold) and cause the charger 106 to switch states. The AC adapter 108 can convert received AC voltage to direct current (DC) voltage.

FIG. 2 shows a charging cycle 200 using a CC state 206 followed by a CV state 210 with an undegraded battery. For example, a lithium-ion (Li-ion) battery is charged at a CC of 1.5 Amps (a 0.5 C-rate, referred to as 0.5 C) until a cutoff voltage threshold 208 is reached, followed by a CV of 4.35V (Volts). During the CV state 210, when current is decreased to a predefined cutoff current threshold 212 (e.g., 0.05 C or 0.15 A in the embodiment shown), the charge is completed 204. The battery capacity line 202 shows how the two states work to achieve a near 3.0 Ah capacity charge 204 of the battery over time. The capacity is read from the left axis. The current line 206/210 shows the current provided to the battery over time in the two phases and is read from the right axis.

FIG. 3 shows a graph that compares the charging process of FIG. 2 with a degraded (e.g., high-cycle or cold) battery using the same settings as the undegraded battery. For example, a degraded Li-ion battery is charged similarly to an undegraded battery shown in FIG. 2. However, the CC state 318 is shortened due to the increased impedance of the degraded battery causing the cutoff voltage threshold 319 to be reached earlier. The cutoff current threshold 322 of 0.05 C (which is 0.15 Amps) also occurs earlier in the CV state 320.

Using the same charging cycle of a fresh battery, a degraded battery is charged at a CC of 1.5 Amps (a 0.5 C-rate, referred to as 0.5 C) until a cutoff voltage threshold 319 is reached, followed by a CV of 4.35V. During a CV state 320, when current is decreased to a predefined cutoff current threshold 322 (e.g., 0.05 C or 0.15 A in the embodiment shown), the charge is completed earlier than in an undegraded battery. The battery capacity line 314 shows how the two states work to achieve a near 0.6 Ah capacity charge 316 of the battery over time. A C-rate is a charge or discharge rate equal to the capacity of a battery in one hour.

An undegraded (e.g., fresh) Li-ion battery is also shown for comparison. The undegraded battery is charged at a CC of 1.5 Amps (a 0.5 C-rate, referred to as 0.5 C) until a cutoff voltage threshold 308 is reached, followed by a CV of 4.35V. During a CV state 310, when current is decreased to a predefined cutoff current threshold 312 (e.g., 0.05 C or 0.15 A in the embodiment shown), the charge is completed 304. The battery capacity line 302 shows how the two states work to achieve a near 3.0 Ah capacity charge 304 of the battery over time.

In some embodiments, battery capacity goes down when a battery is degraded (such as when it is repeatedly high-cycle count). For example, active materials in a Li-ion battery can degrade and do not receive and/or provide Li ions as efficiently. In addition, the impedance of a Li-ion battery increases after cycles or due to cold temperatures. This incremental change in internal impedance results in a degraded/high-cycle count battery that is not fully charged even after charge completion, due to incremental impedance.

During a charging state, OCV is expressed via OCV=V-IR, where V is measured voltage, I is charge current and R is battery impedance (resistance). When an undegraded battery is charged to 4.35V with 0.15 A cutoff and battery impedance is 0.11 Ohm, battery OCV at charge completion is 4.334V (4.35V−0.15 A*0.11 Ohm). Total charge time may be 2.4 hours. For a degraded/high-cycle count battery, if impedance is increased to 0.22 Ohm, OCV at the end of the charge is 4.317V. In some embodiments, it is difficult, at best, to recover battery capacity once the battery is degraded/high-cycle count.

FIG. 4 shows a graph illustrating a charging cycle comparison of a low-cycle count battery, a high-cycle battery and a high-cycle battery with a modified cycle. By using a modified cycle, battery capacity can be further recovered after the battery is degraded/high-cycle count than if undegraded battery settings are used. In the embodiment shown, the CV cutoff can be adjusted by battery OCV and/or battery charge time.

For example, a CV cutoff threshold can be adjusted for a degraded/high-cycle count battery. A CV cutoff current threshold can be lowered and the charge can be stopped when the charge time of the high-cycle count battery reaches X 434 (defined as the charge time of a fresh battery). In some embodiments, use of this process notes a capacity increase of a degraded/high-cycle count battery by 10% compared with use of unadjusted thresholds. As a controller adjusts (lowers) the cutoff current threshold, the charging process mitigates the loss of the charge caused by an increment of impedance of the battery (such as due to cycles and/or temperature).

For example, during charging, the OCV is expressed via OCV=V-IR, where V is measured voltage, I is charge current and R is battery impedance (resistance). When a fresh battery is charged to 4.35V with 0.15 A cutoff and battery impedance is 0.11 Ohm, battery OCV at charge completion is 4.334V (4.35V−0.15 A*0.11 Ohm). Total charge time is 2.4 hours. For a degraded/high-cycle count battery, if battery impedance is increased to 0.22 Ohm, the OCV at the end of the charge is 4.317V although the battery can safely be charged to OCV=4.334V. The cutoff current threshold can be adjusted to account for this difference (e.g., from 0.15 A to 0.075 A). This adjusted cutoff current threshold charges a degraded/high-cycle count battery to 4.334V (4.35V−0.075 A*0.22 Ohm) and charges additional capacity to a degraded/high-cycle count battery.

The charging process can also be modified to suit different situations. In some embodiments, the controller may stop charging a degraded/high-cycle count battery after 2.4 hours, as some users do not like a longer charge time. In other embodiments, if the battery is charged not from empty, the system may stop the charge by the capacity equivalent to charging from empty for X (defined as the charge time of a fresh battery).

A degraded battery charging is shown for comparison. Using the same charging cycle of a fresh battery, a degraded battery is charged at a CC of 1.5 Amps (a 0.5 C-rate, referred to as 0.5 C) until a cutoff voltage threshold 419 is reached, followed by a CV of 4.35V. During a CV state 420, when current is decreased to a predefined cutoff current threshold 422 (e.g., 0.05 C or 0.15 A in the embodiment shown), the charge is completed earlier than in an undegraded battery. The battery capacity line 414 shows how the two states work to achieve a near 0.6 Ah capacity charge 416 of the battery over time. A C-rate is a charge or discharge rate equal to the capacity of a battery in one hour.

An undegraded (e.g., fresh) Li-ion battery is also shown for comparison. The undegraded battery is charged at a CC of 1.5 Amps (a 0.5 C-rate, referred to as 0.5 C) until a cutoff voltage threshold 408 is reached, followed by a CV of 4.35V. During a CV state 410, when current is decreased to a predefined cutoff current threshold 412 (e.g., 0.05 C or 0.15 A in the embodiment shown), the charge is completed 404. The battery capacity line 402 shows how the two states work to achieve a near 3.0 Ah capacity charge 404 of the battery over time.

Figure 5:
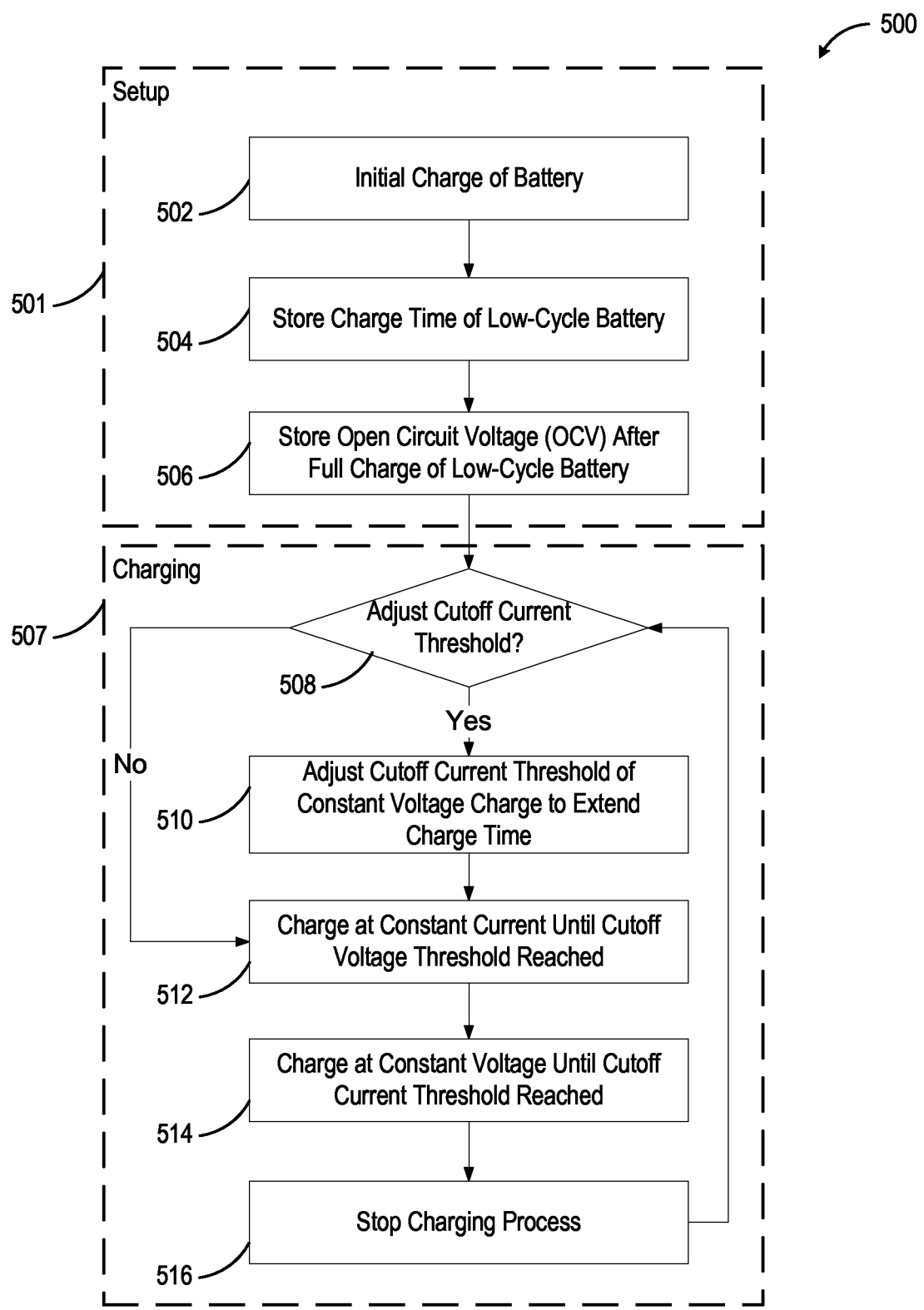
FIG. 5 is a block diagram of a method for charging a battery using a modified cycle based on time consistent with embodiments disclosed herein.
Figure 6:
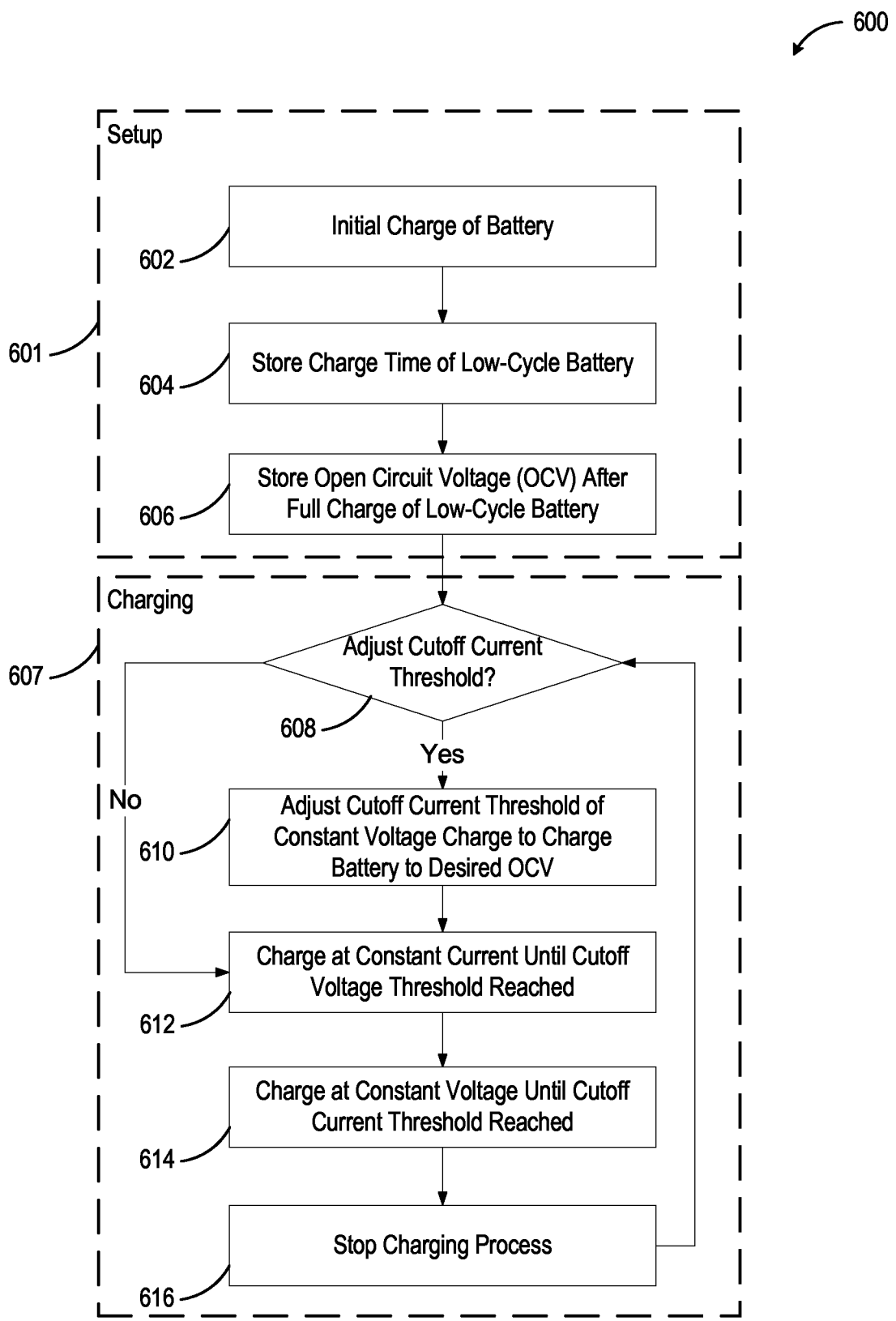
FIG. 6 is a block diagram of a method for charging a battery using an adjusted cycle based on open circuit voltage (OCV) consistent with embodiments disclosed herein.

FIGS. 5 to 6 describe methods that can be used to implement the system and processes described in conjunction with FIGS. 1 to 4. The methods described in FIGS. 5 and 6 can be implemented by the system 100 shown in FIG. 1, including battery 102, controller 104, charger 106 and AC adapter 108. Depending on the embodiment, instructions for implementing the methods described can reside in software, firmware or circuits of the charge controller. FIG. 5 shows a method based on charge time. FIG. 6 shows a method based on OCV.

In the embodiment shown in FIG. 5, a process 500 is shown that charges a battery based on charge time. The process 500 can include a one-time setup phase 501 and a charging phase 507. In the setup phase 501, initial measurements are stored. A battery can be initially charged in block 502. In block 504, a charge time of the initial charge (a low-cycle count battery) can be stored. In block 506, an OCV of the fully charged battery can be stored (such as after the initial charge).

In the charging phase 507, one or more of the stored values from the setup phase 501 can be used to adjust cutoff thresholds. In block 508, a controller determines whether to adjust a cutoff current threshold due to a degraded battery. If so and in block 510, a cutoff current threshold of a constant voltage charging phase is modified (such as based on a battery impedance). If not, the cutoff current threshold remains at its prior or default level. The process then moves from block 508 or 510 to block 512. In block 512, the charging system charges the battery at a constant current until a cutoff voltage threshold is reached. In block 514, the charging system charges the battery at a constant voltage until a cutoff current threshold is reached. In block 516, the charging process stops and returns to block 508 on whether to adjust a cutoff current threshold.

In one embodiment, an implementation can include initial operations and operations based on a degraded (e.g., a high-cycle count battery). In initial operations, the controller memorizes the charge time of a fresh battery referred to as X. When it is determined that a charging battery is a degraded/high-cycle count battery, the controller adjusts/lowers the cutoff current threshold of the CV charge so that the charge time from empty is extended to X.

In the embodiment shown in FIG. 6, a process 600 is shown that charges a battery based on OCV. The process 600 can include a one-time setup phase 601 and a charging phase 607. In the setup phase 601, initial measurements are stored. A battery can be initially charged in block 602. In block 604, a charge time of the initial charge (a low-cycle count battery) can be stored. In block 606, an OCV of the fully charged battery can be stored (such as after the initial charge).

In the charging phase 607, one or more of the stored values from the setup phase 601 can be used to adjust cutoff thresholds. In block 608, a controller determines whether to adjust a cutoff current threshold due to a degraded battery. If so and in block 610, a cutoff current threshold of a constant voltage charging phase is modified (such as based on a battery impedance). If not, the cutoff current threshold remains at its prior or default level. The process then moves from block 608 or 610 to block 612. In block 612, the charging system charges the battery at a constant current until a cutoff voltage threshold is reached. In block 614, the charging system charges the battery at a constant voltage until a cutoff current threshold is reached. In block 616, the charging process stops and returns to block 608 on whether to adjust a cutoff current threshold.

In one embodiment, an implementation can include initial operations and operations based on a degraded (e.g., a high-cycle count battery). In initial operations, the controller can store an OCV measurement after a full charge of fresh (e.g., low-cycle count) battery (the measurement referred to as Y). When it is determined that a charging battery is a degraded/high-cycle count battery, the controller decreases the cutoff current threshold of the CV charge so that the new cutoff current threshold leads the battery OCV to Y.

Figure 7:
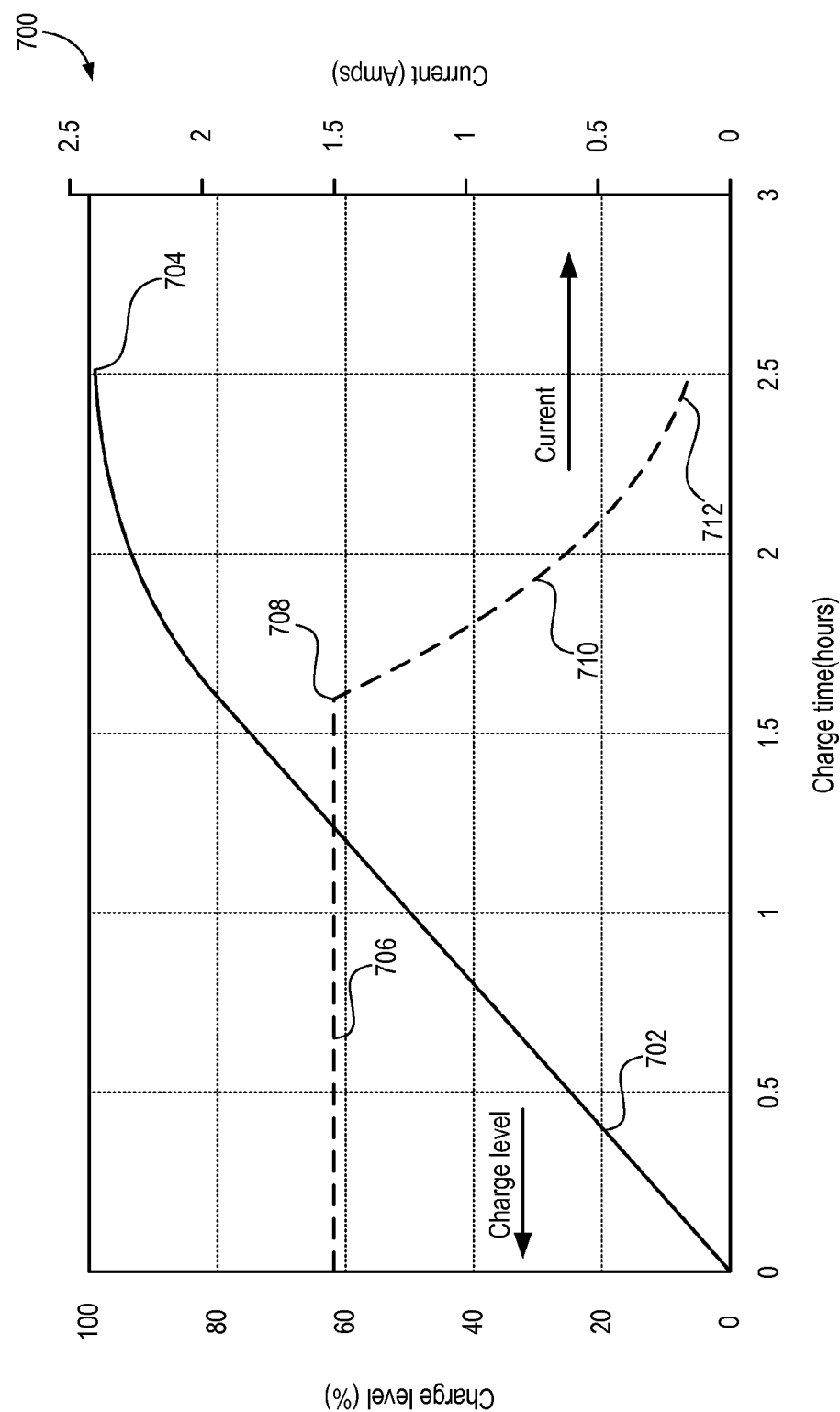
FIG. 7 is a graph illustrating a charging of a low-cycle count battery consistent with embodiments disclosed herein.
Figure 8:
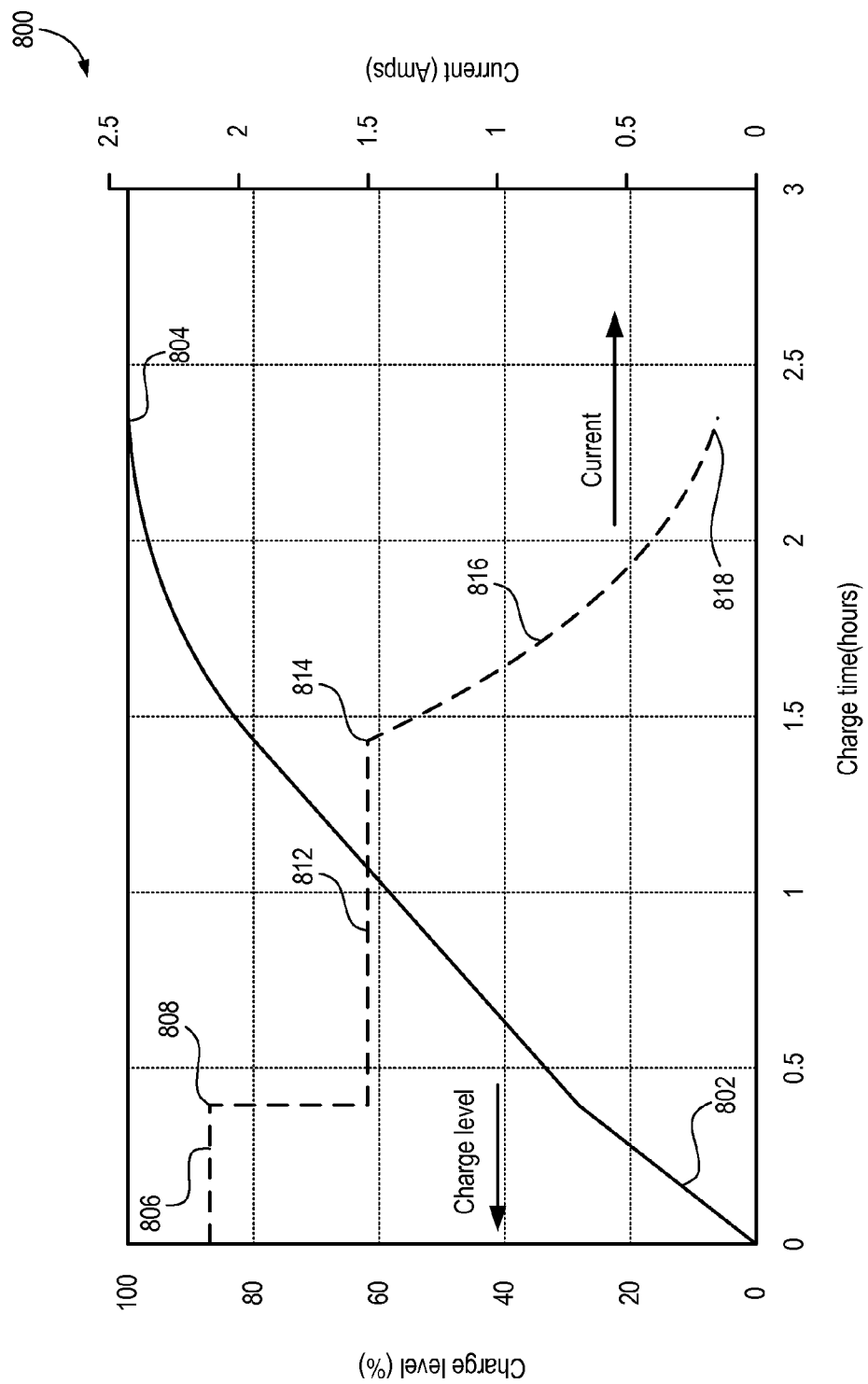
FIG. 8 is a graph illustrating a faster charging of a low-cycle count battery consistent with embodiments disclosed herein.
Figure 9:
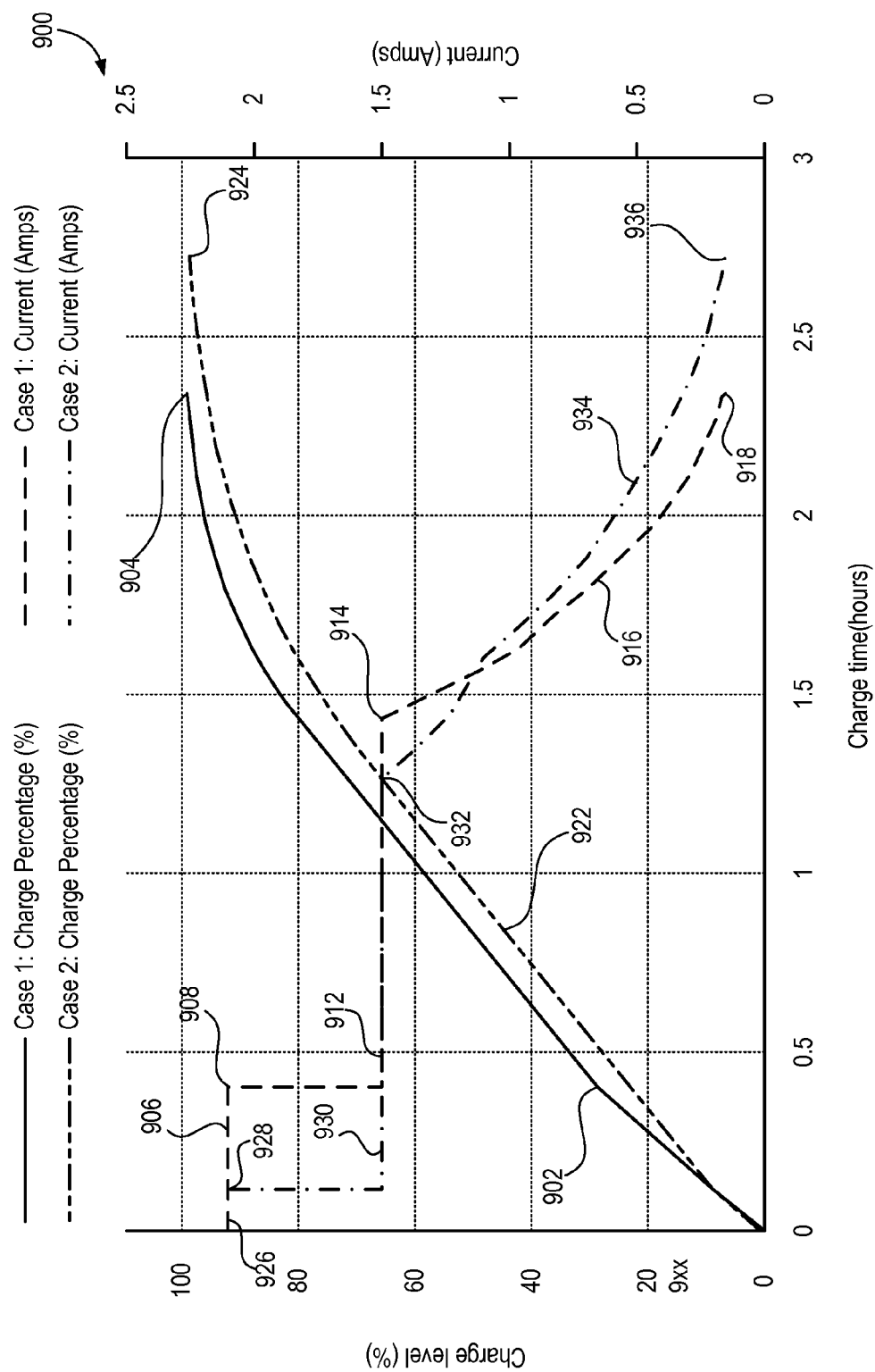
FIG. 9 is a graph illustrating a comparison of faster charging of a low-cycle count battery and a high-cycle battery consistent with embodiments disclosed herein.
Figure 10:
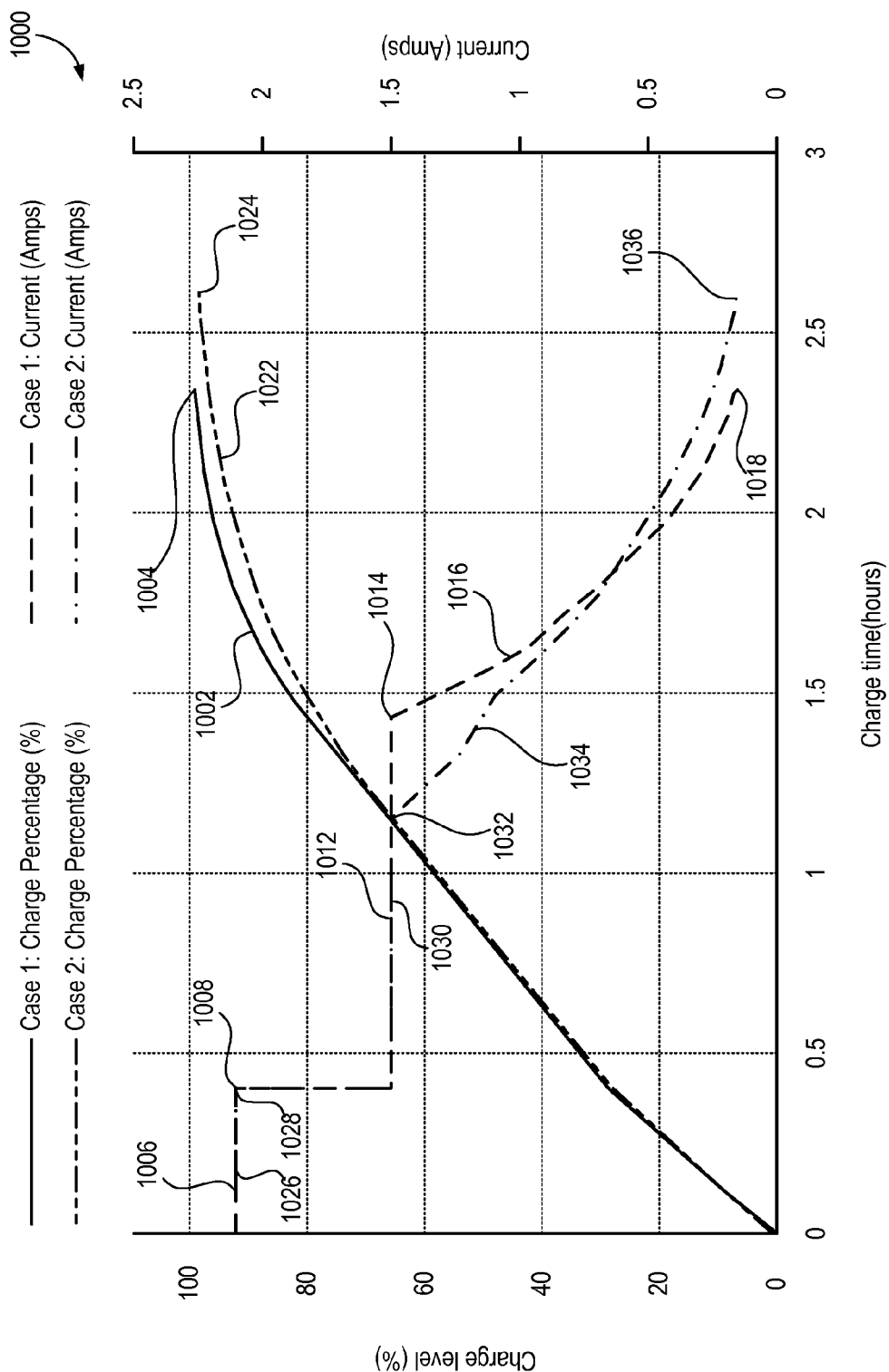
FIG. 10 is a graph illustrating a comparison of faster charging of a low-cycle count battery and a modified faster charging of a high-cycle battery consistent with embodiments disclosed herein.
Figure 11:
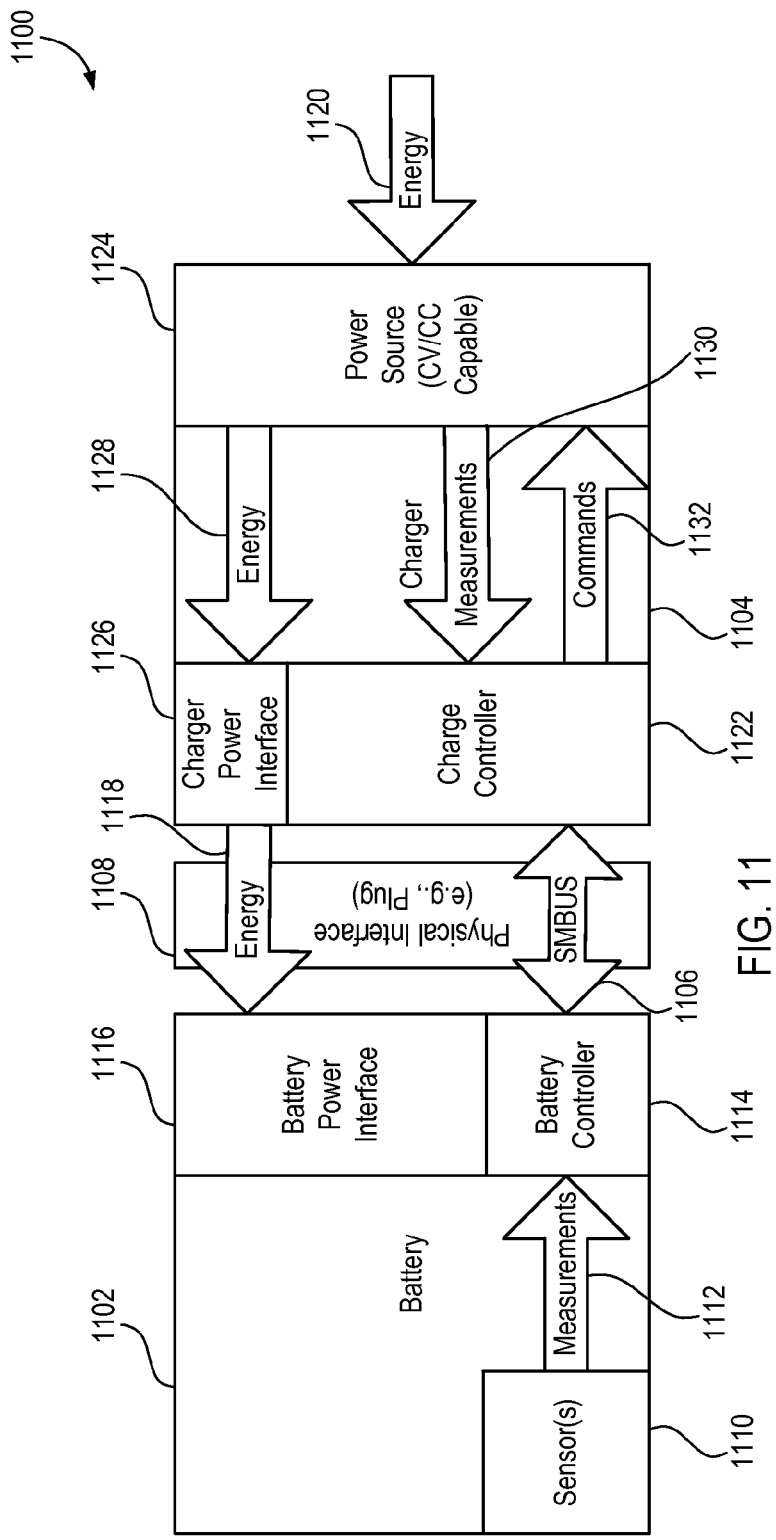
FIG. 11 is a system diagram illustrating a battery and charger communication consistent with embodiments disclosed herein.

FIGS. 7 to 10 are used to describe a charging system than can be used for modifying a cutoff current threshold of a step charging system to decrease charge time. FIGS. 1 and 11 show examples of systems that can be used. FIGS. 7 to 10 show graphs that describe the charging parameters of the system with and without enhancements. FIG. 7 shows a graph that describes a charging process using a CC with a cutoff voltage threshold followed by a CV with a cutoff current threshold using an undegraded (e.g., fresh or low-cycle count room-temperature) battery. FIG. 8 shows a graph that describes a step charging process using two CC phases with cutoff voltage thresholds followed by a CV phase with a cutoff current threshold using an undegraded battery. FIG. 9 shows a graph that compares the step charging process of FIG. 8 with a degraded (e.g., high-cycle or cold) battery using the same settings as the undegraded battery. FIG. 10 shows a graph that compares the charging processes of FIGS. 8 and 9 by modifying the cutoff voltage thresholds for a degraded battery.

FIG. 7 shows a charging cycle 700 using a CC state 706 followed by a CV state 710 with an undegraded battery. For example, a Li-ion battery is charged at a CC of 1.5 Amps (a 0.5 C-rate, referred to as 0.5 C) until a cutoff voltage threshold 708 is reached, followed by a CV of 4.35V. During the CV state 710, when current is decreased to a predefined cutoff current threshold 712 (e.g., 0.05 C or 0.15 A in embodiment shown), the charge is completed 704. A charge level line 702 shows how the two states work to achieve a 100% capacity charge 704 of the battery over time. The charge level is read from the left axis. The current line 706/710 shows the current provided to the battery over time in the two phases and is read from the right axis.

For example, a Li-ion battery is charged at a CC, followed by a CV. A normal charge can start with a 0.5 C-CC charging phase, followed by 4.35V CV charging phase.

In some embodiments, a step charging process can be used to make a charge time faster. FIG. 8 shows a step charging cycle 800 using two CC states 806 and 812 followed by a CV state 816 with an undegraded battery. In the embodiment shown, a rechargeable power source is charged at a first CC level until a first cutoff voltage threshold 808 is reached, after which the rechargeable power source is charged at a second CC level until a second cutoff voltage threshold 814 is reached. The second CC level is followed by a CV state. During the CV state 816, when current is decreased to the predefined cutoff current threshold 818 (e.g., 0.05 C), the charge is completed. A charge level line 802 shows how the two states work to achieve a 100% capacity charge 804 of the battery over time. The charge level is read from the left axis. The current line 806, 812 and 816 shows the current provided to the battery over time in the three phases and is read from the right axis.

For example, a charger uses a first CC step at 0.7 C (a higher current than shown in FIG. 7) until a 4.1V first cutoff voltage threshold. This higher CC step is followed by a second CC step using a 0.5 C until a second cutoff voltage threshold is reached (-CV charge). In this embodiment, a first cutoff voltage threshold of the first step current is 4.1V. It should be recognized that when a step is used in conjunction with a constant current, it is intended to reference the constant current step and not an operation (nor an ordered operation). While the example shown includes two CC steps, it should be recognized that more than two CC steps (or phases) can be used.

FIG. 9 shows a comparison between a degraded battery and an undegraded battery when using a step charging process. For example, when a battery is aged, battery impedance goes up and battery charge takes longer. In another example, when a battery is cold, battery impedance goes up and battery charge takes longer. An increased battery impedance results in an earlier exit from the first CC step and a longer charge time.

FIG. 9 shows an undegraded rechargeable power source for comparison (case 1). The rechargeable power source is charged at a first CC phase 906 until a first cutoff voltage threshold 908 is reached, after which the rechargeable power source is charged at a second CC level 912 until a second cutoff voltage threshold 914 is reached. The second CC level 912 is followed by a CV phase 916. During the CV phase 916, when current is decreased to a predefined cutoff current threshold 918 (e.g., 0.05 C), the charge is completed.

A degraded battery charged using a step charging process with the same parameters as an undegraded battery can result in an earlier exit from a constant current step phase and a longer charge time (case 2). A degraded battery can be charged at a first constant current 926 until a cutoff voltage threshold 928 is reached. Due to the impedance of the battery, the first constant current phase of the degraded battery can be shorter than a first constant current phase 906 of an undegraded battery. The degraded battery can then be charged at a second constant current 930 until a second cutoff voltage threshold 932 is reached. After that, the degraded battery can be charged using a constant voltage 934 until a cutoff current threshold is reached 936. The charging process can then be stopped.

While FIG. 9 shows two phases of constant current, in some embodiments, more than two phases are used. For example, in one embodiment, four constant current steps are used in conjunction with four cutoff voltage thresholds. After the four constant current steps, the battery can be charged with a constant voltage.

For example, for an aged cell (e.g., a high-cycle count battery), when a first step current exceeds a cutoff voltage threshold (e.g., 4.1V), an OCV is lower than that of a fresh battery. This can be due to battery impedance. OCV is expressed via OCV=V(measured)−I*R, where V(measured) is a measured voltage, I is charge current and R is battery impedance. Since R of aged batteries is greater than that of a fresh battery, the OCV of an aged battery is lower. At ~65% of charge level, an aged battery can take about 10% longer to charge than a fresh battery due to internal impedance of the battery.

FIG. 10 shows a graph 1000 comparing a modified step charging process using a degraded battery (case 2) and a step charging process with an undegraded battery (case 1). A controller can adjust a cutoff voltage threshold of the first cutoff voltage threshold 1028 based at least in part on battery impedance. Using the adjusted first cutoff voltage threshold 1028, a charger can charge at a first constant current 1026 until the adjusted first cutoff voltage threshold 1028 is reached. The charger can then charge at a second cutoff current threshold 1030 until a second cutoff voltage threshold 1032 is reached. The charger can then charge at a constant voltage 1034 until a cutoff current threshold 1036 is reached.

Depending on the embodiment, second cutoff voltage thresholds and subsequent cutoff voltage thresholds can be adjusted or not. In one embodiment, all cutoff voltage thresholds except a final cutoff voltage threshold are adjusted. In another embodiment, only the first cutoff voltage threshold is adjusted. In yet another embodiment, all cutoff voltage thresholds are adjusted based on a change of an internal impedance of a rechargeable power source.

FIG. 10 also shows an undegraded rechargeable power source for comparison. The rechargeable power source is charged at a first CC level 1006 until a first cutoff voltage threshold 1008 is reached, after which the rechargeable power source is charged at a second CC level 1012 until a second cutoff voltage threshold 1014 is reached. The second CC level 1012 is followed by a CV phase 1016. During the CV phase 1016, when current is decreased to a predefined cutoff current threshold 1018 (e.g., 0.05 C), the charge is completed.

For example, an undegraded battery impedance is 110 mOhm, while an aged battery impedance is 170 mOhm. A first step charge current is 2.1 A and a first step charge cutoff is 4.1V for an undegraded battery. The first step charge cutoff voltage threshold can be adjusted from 4.1V to 4.226V for a degraded battery using the following calculation.

$$OCV = (4.1V - 2.1 A * 0.11\ Ohm) = 3.869V$$

$$3.869V + 2.1 A * 0.17\ Ohm = 4.226V$$

By altering the cutoff voltage threshold, a charge time to about 65% of a degraded battery (shown in charge time at a cutoff current threshold 1036) can be approximately as an undegraded battery (shown in charge time at a cutoff current threshold 1018).

In the embodiment shown in FIG. 10, two CC phases are followed by a CV phase. This series of charging operations can be represented by the abbreviation CC-CC-CV. In some embodiments, a CC-CV-CC-CV set of charging operations can be used. A battery is charged using CC at a first level during a first CC phase until a first cutoff voltage threshold is reached. The first cutoff voltage threshold is then held during a first CV phase and the current is allowed to float down to a first cutoff current threshold equal to a CC level of the next CC phase. The first cutoff current threshold is then held during a second CC phase until a second cutoff voltage threshold is reached. The charger can then charge using CV during a second CV phase until a second cutoff current is reached. Once the second cutoff current is reached, the charging can stop.

Other combinations are also possible. For example, a CC-CV-CC-CC-CV or CC-CC-CV-CC-CV combination can be used. In some embodiments, transitions from CC to CV can hold a cutoff voltage threshold from the CC phase. In several embodiments, transitions from CV to CC can hold a cutoff current threshold from the CV phase. In other embodiments, current settings for CC phases and voltage settings for CV phases can be retrieved from storage or dynamically calculated to minimize battery degradation, charge to a higher capacity and/or reduce charging time.

The various cutoff current thresholds and cutoff voltage thresholds can be adjusted as described herein. The adjustments can be based on battery impedance, estimated OCV, number of cycles, temperature, etc. and/or a combination of two or more battery characteristics or measurements.

In some embodiments, constant current phase configurations are chosen to minimize degradation of cell and/or maximize charging time. For example, a battery controller can be configured to select a constant current when an estimated OCV is within a range. In another example, the battery controller can be configured to prevent currents above a current threshold for an estimated OCV within given OCV range. In some embodiments, by preventing currents above a threshold within an OCV range, a charger or battery controller can minimize battery degradation.

FIG. 11 shows a diagram 1100 of a battery 1102 connected to a charger 1104 through a physical interface 1108 using a SMBUS 1106 for communication. The battery 1102 can include sensors 1110, battery power interface 1116 and battery controller 1114. The sensors 1110 can measure aspects of the battery 1102, such as OCV, charge current, charge voltage, etc. The battery power interface 1116 can receive energy 1118 over the physical interface 1108 from the charger 1104 and provide the energy 1118 to the battery 1102. The battery power interface 1116 can also include safety features that prevent damage to the battery 1102 (e.g., overvoltage protection, thermal shutdown, etc.). The battery controller 1114 can receive measurements 1112 from sensors 1110 and communicate with the charger 1104 over a control channel such as the SMBUS 1106. The battery controller 1114 can also include stored information such as number of charge cycles, tables of cutoff thresholds, original OCV of the battery, original charge time of the battery 1102, original impedance of the battery 1102, etc.).

The charger 1104 can include a charge controller 1122, a power source 1124 and a charger power interface 1126. The charge controller 1122 can receive messages over a control channel (such as the SMBUS 1106 or I2C (inter-integrated circuit bus), etc.), configure the power source 1124 (such as through commands 1132) and receive measurements 1130. The power source 1124 can provide energy 1128 to be delivered to and/or charge the battery 1102. The power source 1124 can be configured by the charge controller 1122, including configurations such as constant current and/or constant voltage settings. The power source 1124 can provide measurements 1130 to the charge controller 1122, such as voltage, current and power information. The power source 1124 can receive input energy 1120 (such as from an AC adapter or wall outlet) to convert into the energy 1128 to charge the battery 1102. The charger power interface 1126 can couple the energy 1128 from the power source 1124 to the battery power interface 1116. The charger 1104 (such as the charger power interface 1126, etc.) can include safety features (e.g., overvoltage, thermal and/or power protection).

The battery controller 1114 can send messages that cause the charger 1104 (by way of the charge controller 1122) to perform actions. For example, the battery controller 1114 can send a message using an SMBUS protocol to the charge controller 1122 which causes the charge controller 1122 to modify charging settings of the power source 1124 that provides energy 1118 to the battery 1102 over the charger power interface 1126 to the battery power interface 1116 via a physical interface 1108. The battery controller 1114 can send messages to the charge controller 1122 to request a constant current charge at a specified constant current value, a constant voltage charge at a specified constant voltage value, that charging stop at a specified cutoff current threshold, that charging stop at a specified voltage cutoff threshold, etc. In addition, the battery controller 1114 can send messages to the charge controller 1122 to enqueue a series of actions with specified thresholds to cause a transition from one action to another action in the queue. In other embodiments, the charge controller 1122 can perform the same or similar tasks.

In some embodiments, the battery controller 1114 can communicate with the charge controller 1122 to cause a series of constant current step charges. The battery controller 1114 can send a series of messages to the charge controller 1122 to dynamically alter constant current step charges.

It should be recognized that FIG. 11 represents an embodiment, but that elements of the systems can be located and/or combined differently. For example, sensors 1110 can be located in the charger 1104 with measurements of the battery 1102 occurring across the physical interface 1108. Other combinations are also possible.

Depending on the embodiment, the charging instructions can reside in software, firmware and/or circuits of the charge controller. Embodiments described herein can also be integrated in SOCs with integrated chargers, PMICs with integrated chargers, etc.

Some of the information herein is based on simulation results. A battery capacity was used both in a simulation for an undegraded cell and a degraded cell to simulate the effect of charging using the different described embodiments.

Other optional features can also be implemented. In an embodiment, the adjusted cutoff voltage threshold of a first step may not exceed the voltage of a CV phase or safety level. A cutoff voltage threshold adjustment can be applied to other steps if a step charge includes more than one CC step. A cutoff voltage threshold of a first step charge can be sent from a fuel gauge to a charge controller through SMBUS or I2C. A cutoff voltage threshold of a first step charge can be adjusted by the dynamic change of the "charging voltage" parameter in a fuel gauge.

Figure 12:
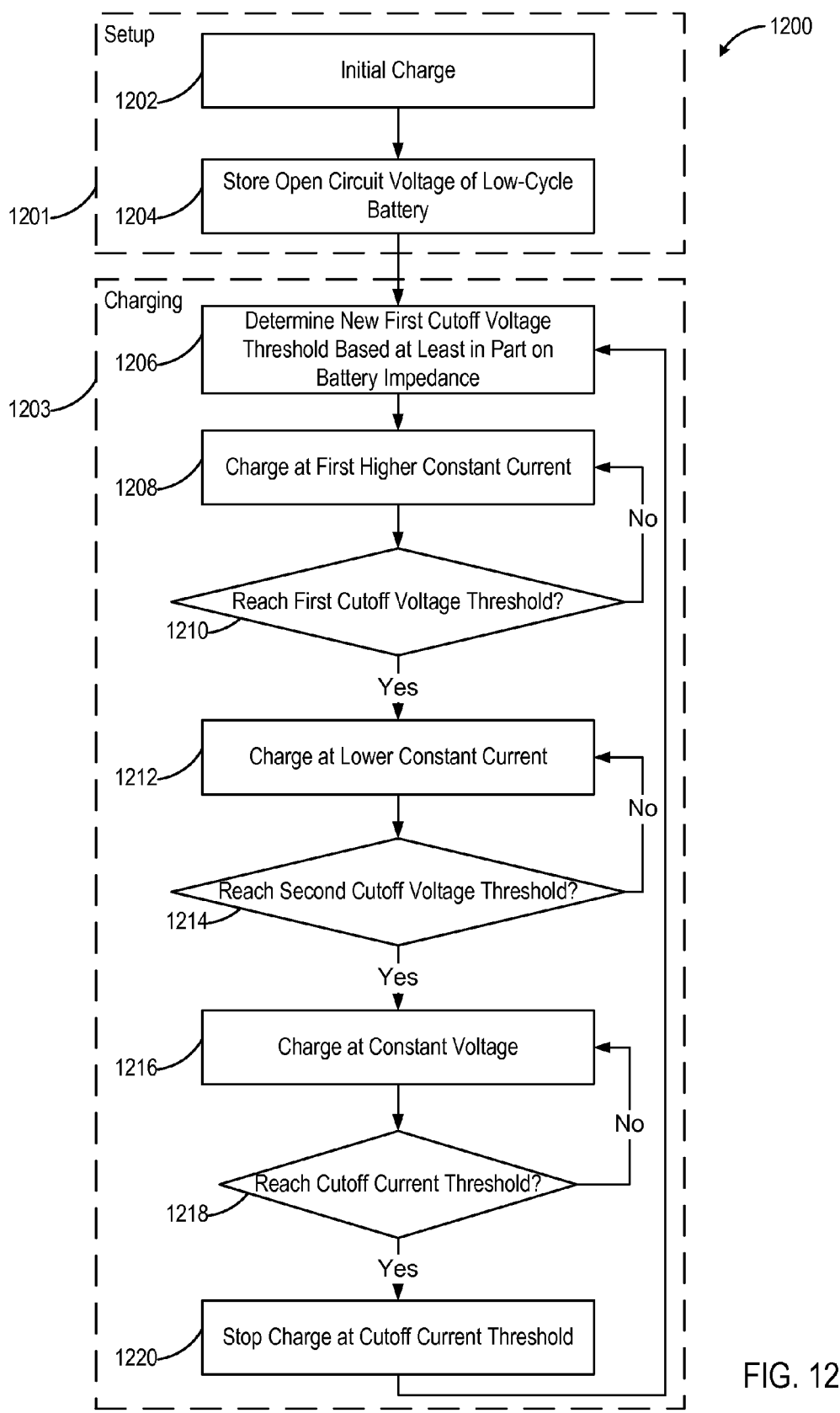
FIG. 12 is a flow chart illustrating a method for a modified step charging of a high-cycle battery consistent with embodiments disclosed herein.

FIG. 12 shows a method 1200 of constant current step charging a degraded battery. In an initial setup phase 1201, a controller can store undegraded battery information. In block 1202, an undegraded battery receives an initial charge.

In block 1204, the OCV of the undegraded battery (such as a low-cycle count battery) is stored. In other embodiments, the initial information can be stored at a factory without the initial charge and measurements.

In a charging phase 1203, a step charge can be altered to accommodate degraded battery impedance. In block 1206, an adjusted cutoff voltage threshold can be determined based at least in part on the battery impedance and the stored OCV. In block 1208, the charger can charge at a first constant current that is higher than a subsequent phase. In block 1210, a controller can determine whether the adjusted cutoff voltage threshold has been met. If not, the charging can continue in block 1208. If so, a second constant current charging phase can begin in block 1212. In block 1214, a controller can determine whether the second cutoff voltage threshold has been met. If not, charging can continue in block 1212. If so, the charger can begin a constant voltage charging phase in block 1216. In block 1218, a controller can determine whether the adjusted cutoff current threshold has been met. If not, the charging can continue in block 1216. If so, the charging can stop in block 1220. The system can then return to block 1206 and await a next charging phase 1203.

In some embodiments, use of the described process can improve charge time after a battery is degraded. Use of the process can allow the system to adjust the cutoff voltage threshold of the first step charge based on battery impedance.

For example, in an initial phase, a controller memorizes or calculates the OCV of an undegraded battery (labeled as X). When it is determined that the battery is degraded, the controller adjusts a cutoff voltage threshold of a first step charge based on impedance of the battery. A new cutoff voltage threshold Y is calculated by:

$$Y = X + I * \Delta R$$

Where I is charge current and $\Delta R$ is additional battery impedance of the degraded battery (e.g. high-cycle count, cold, etc.). The battery can then be charged using the new cutoff voltage threshold of the first step charge.

Figure 13:
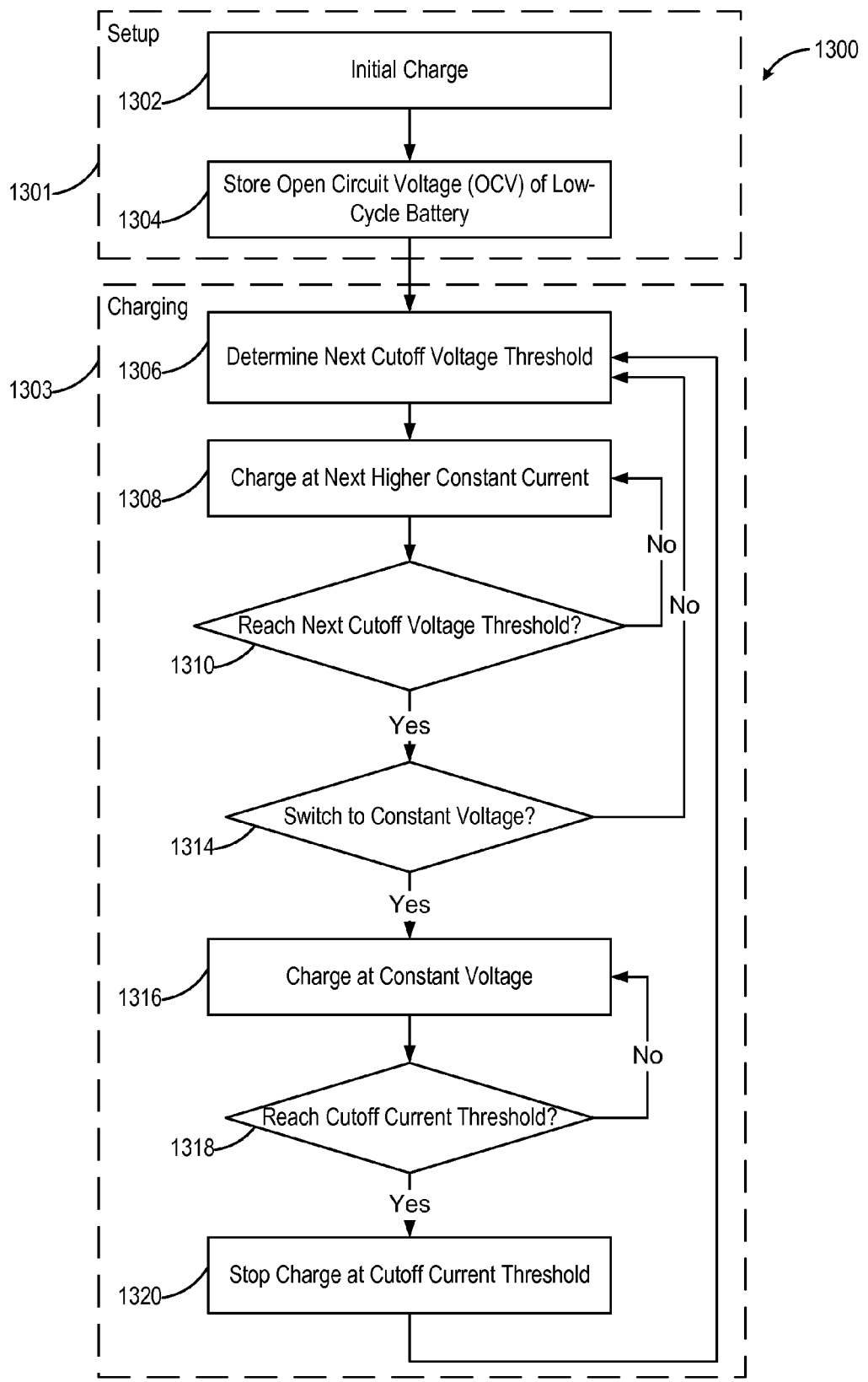
FIG. 13 is a flow chart illustrating an alternate method for a modified step charging of a high-cycle battery consistent with embodiments disclosed herein.

FIG. 13 shows a dynamic step charging process 1300. In an initial setup phase 1301, an OCV of an undegraded battery is stored. In the embodiment shown, the OCV is stored after an initial charge. In block 1302, an initial charge is performed. In block 1304, an OCV of the battery is stored after the initial charge. In some embodiments, the setup phase can instead use a stored value from the factory rather than a measured value.

In a charging phase 1303, a controller can use multiple constant current charging operations. These operations can be scheduled based on reaching a cutoff voltage threshold and/or actively managed by a controller. In block 1306, a first cutoff voltage threshold is determined. A charger charges a battery at a first constant current in block 1308. In block 1310, the charger or controller determines whether the first cutoff voltage threshold has been reached. If not, the charger continues to charge at the same constant current level. If so, then in block 1310 the controller or charger determines whether the system should switch to a constant voltage charging. If not, the charger or controller returns to set up a next cutoff voltage threshold in block 1306 and charge at a next constant current in blocks 1310 to 1314. However, if the charger or controller determines to switch to constant voltage charging in block 1314, then the charger or controller will charge the battery at a constant voltage in block 1316. The charger or controller determines whether a cutoff current threshold is reached in 1318. If not, the charger or controller continues to charge at a constant voltage level in block 1316. If so, the charger or controller stops charging in block 1320. The system then awaits the next charging phase 1303 at block 1306.

It should be recognized that the cutoff current thresholds can be stored in memory or dynamically determined. In one embodiment, the charger or controller retrieves a list of constant current configuration including cutoff voltage thresholds and current settings from non-volatile memory. In another embodiment, the charger or controller uses an OCV or number of cycles to estimate battery impedance. Using the estimated impedance, the charger or controller can dynamically adjust cutoff voltage thresholds and constant current settings to more quickly charge a battery. In some embodiments, a current threshold is used for ranges of estimated OCV. When the estimated OCV is within a range of OCV values, the charger is configured not to exceed an associated current threshold. Each range of OCV can have a current threshold.

Figure 14:
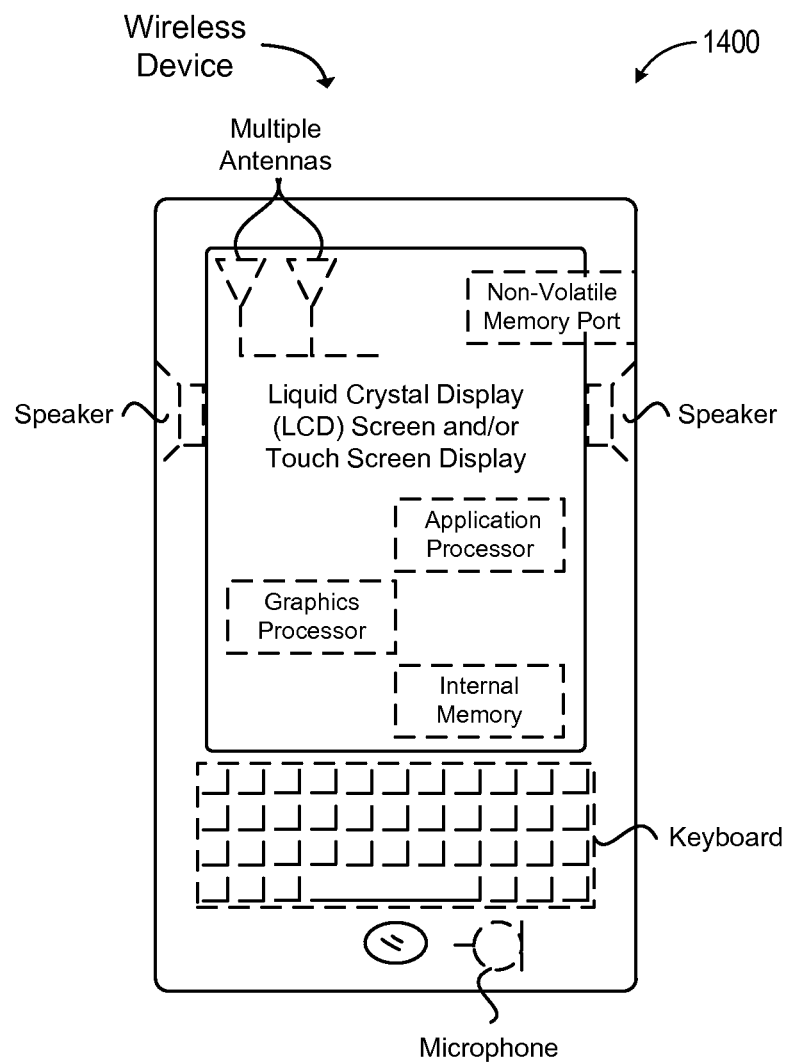
FIG. 14 is an example illustration of a mobile device consistent with embodiments disclosed herein.

FIG. 14 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Figure 15:
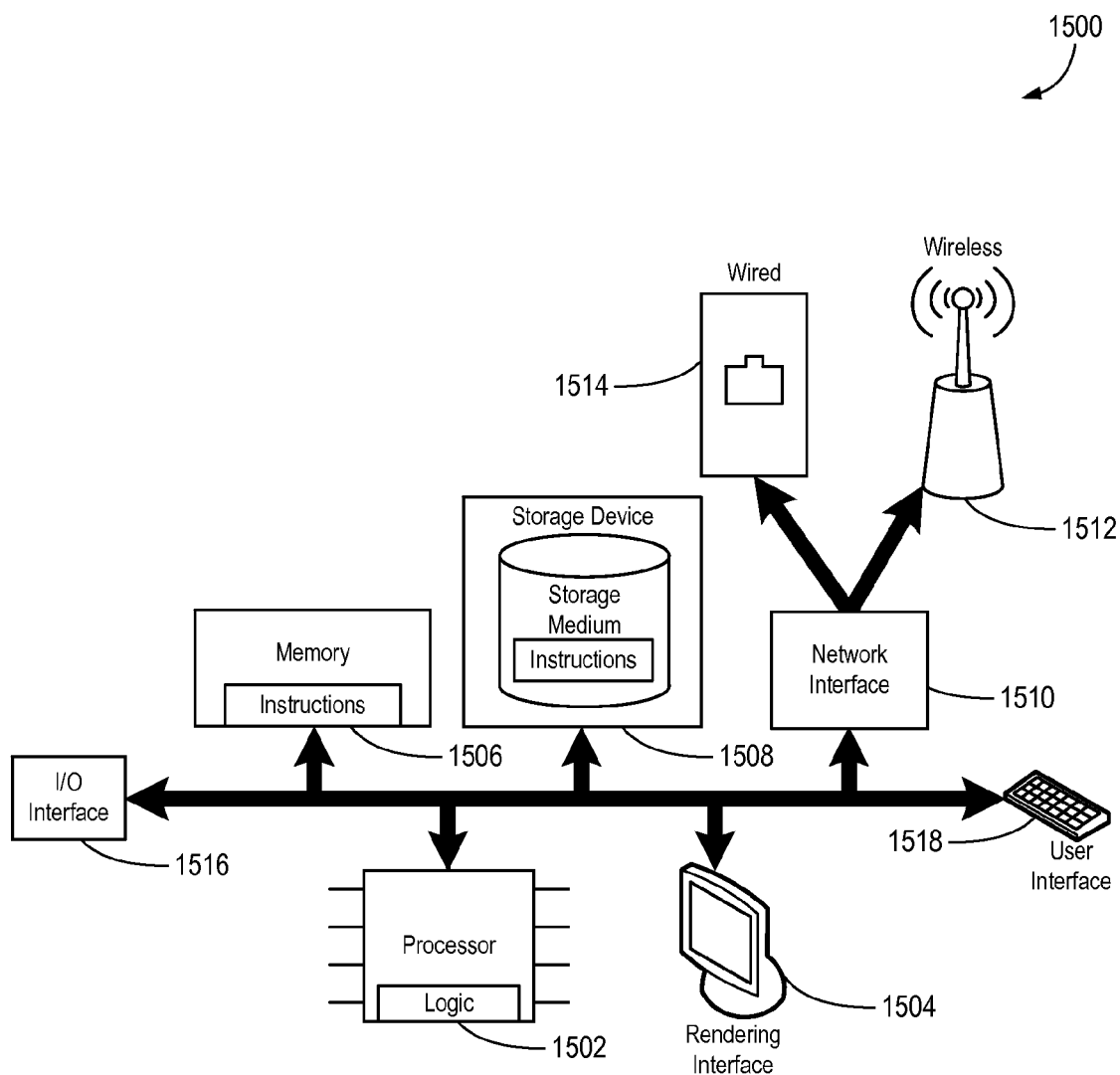
FIG. 15 is a schematic diagram of a computing system consistent with embodiments disclosed herein.

FIG. 15 is a schematic diagram of a computing system 1500. The computing system 1500 can be viewed as an information passing bus that connects various components. In the embodiment shown, the computing system 1500 includes a processor 1502 having a logic 1502 for processing instructions. Instructions can be stored in and/or retrieved from a memory 1506 and a storage device 1508 that includes a computer-readable storage medium. Instructions and/or data can arrive from a network interface 1510 that can include wired 1514 or wireless 1512 capabilities. Instructions and/or data can also come from an I/O interface 1516 that can include such things as expansion cards, secondary buses (e.g., USB, etc.), devices, etc. A user can interact with the computing system 1500 though user interface devices 1518 and a rendering interface 1504 that allows the computer to receive and provide feedback to the user.

EXAMPLES

The following examples pertain to further embodiments.

Example 1 is a charging system for charging a battery. The charging system includes a memory configured to store an open circuit voltage (OCV) of a low-cycle count battery. The charging system further includes a sensor configured to determine an impedance of the battery. The charging system also includes a controller. The controller can determine a first cutoff voltage threshold of a first constant current operation in a step charging of the battery based at least in part on the determined impedance of the battery and the stored OCV. The controller can also cause a power source to provide a first constant current until the first cutoff voltage threshold is reached.

In Example 2, the controller of Example 1 can optionally signal the power source to provide the first constant current until the first cutoff voltage threshold is reached.

In Example 3, the controller of Examples 1-2 can optionally determine a second cutoff voltage threshold of a second constant current operation in the step charging of the battery based at least in part on the determined impedance of the battery and the stored OCV. The controller can further cause the power source to provide a second constant current until the second cutoff voltage threshold is reached.

In Example 4, the controller in Example 3 can optionally cause the power source to provide a constant voltage between the first constant current and the second constant current.

In Example 5, the controller in Example 4 can optionally hold the first cutoff voltage threshold until current delivered to the battery reaches the second constant current.

In Example 6, after a final cutoff voltage threshold has been reached in a set of constant current step operations the controller in Examples 1-5 can optionally provide a constant voltage to the battery until a cutoff current threshold is reached.

In Example 7, the controller of Examples 1-6 can optionally dynamically adjust a constant current and a cutoff voltage threshold during step charging of the battery.

In Example 8, the system of Examples 1-7 can optionally include the power source.

In Example 9, the system of Examples 1-8 can optionally include a bus between the power source and the controller configured to carry messages from the controller to the power source that cause the power source to provide a constant current to the battery.

In Example 10, the battery of Examples 1-9 can optionally be a lithium-ion (Li-ion) battery.

Example 11 is system for adaptive charging. The system a controller, a sensor configured to sense a voltage of a rechargeable power source, a bus interface between the controller and a charging system coupled to the rechargeable power source. The controller is configured to receive measurements from the sensor and estimate an open circuit voltage (OCV) of the rechargeable power source based at least in part on the measurements from the sensor. The controller is further configured to revise a current threshold based at least in part on the estimated OCV. The controller is also configured to communicate with the charging system over the bus interface to dynamically adjust a constant current of a constant current source and to approximately maintain a current below the current threshold associated with the estimated OCV to the rechargeable power source during a charging of the rechargeable power source.

In Example 12, the controller of Example 11 can optionally keep the estimate of the OCV updated based at least in part on the monitoring of the measurements. The controller can optionally further update the current threshold when the estimated OCV exceeds an OCV threshold. The controller can also optionally communicate the updated current threshold to the charging system after the current threshold is updated.

In Example 13, the rechargeable power source of Examples 11-12 is a lithium-ion (Li-ion) battery.

In Example 14, the system in Examples 11-13 can optionally include memory configured to store an undegraded OCV of an undegraded rechargeable power source at room temperature.

In Example 15, the system in Examples 11-13 can optionally include memory configured to store an undegraded OCV of an undegraded rechargeable power source.

In Example 16, the bus interface in Examples 11-15 can optionally be a system management bus (SMBUS) or I2C interface.

In Example 17, the system of Examples 11-16 can optionally include the charging system.

In Example 18, the system of Example 17 can optionally include a portable computer, cell phone, tablet or drone that comprises the charging system.

In Example 19, after a final cutoff voltage threshold has been reached, the controller of Examples 11-18 can optionally provide a constant voltage to the rechargeable power source until a cutoff current threshold is reached.

Example 20 is a method of charging a battery. The method can include storing an initial open circuit voltage (OCV) of a fully charged rechargeable power source. The method can further include determining a revised cutoff current threshold during constant voltage charge based at least in part on an indication that an OCV of a rechargeable power source has reached the initial OCV. The method can also include charging the rechargeable power source at a constant current until a cutoff voltage threshold is reached. The method can further include charging the rechargeable power source at a constant voltage until the revised cutoff current threshold is reached.

In Example 21, the method of Example 20 can optionally include a revised cutoff current threshold that is lower than a cutoff current threshold of a low-cycle count rechargeable power source at room temperature.

In Example 22, the method of Example 20-21 can optionally include counting a number of cycles and retrieving a cutoff current threshold from a table that corresponds to the number of cycles.

In Example 23, the method of Example 20-22 can optionally include measuring temperature and retrieving a cutoff current threshold from a table that corresponds to the temperature.

In Example 24, the method of Example 20-23 can optionally include estimating an OCV of the rechargeable power source, determining an impedance of the rechargeable power source and calculating the revised cutoff current threshold based at least in part on the initial OCV.

Example 25 is a method of charging a battery. The method includes storing an initial charge time of a fully charged battery and determining a revised cutoff current threshold during constant voltage charge based at least in part on matching a charge time of the battery to the initial charge time. The method further includes causing the battery to charge at a constant current until a cutoff voltage threshold is reached. The method also includes causing the battery to charge at a constant voltage until the revised cutoff current threshold is reached.

In Example 26, the method of Example 25 can optionally include a revised cutoff current threshold that is lower than a cutoff current threshold of a low-cycle count battery at room temperature.

In Example 27, the method of Example 25-26 can optionally include transmitting a first message to a charger to charge the battery at the constant current and transmitting a second message to the charger to charge the battery at the constant voltage.

In Example 28, the method of Example 25-27 can optionally include determining the revised cutoff current threshold based at least in part on battery temperature.

In Example 29, the method of Example 25-28 can optionally include measuring a temperature and a number of cycles and retrieving a cutoff current threshold from a table that corresponds to the temperature and the number of cycles.

In Example 30, the method of Example 25-29 can optionally include measuring an open circuit voltage (OCV).

Example 31 is a method of charging a battery. The method includes storing an open circuit voltage (OCV) of a low-cycle count battery and determining an impedance of the battery. The method further includes determining a first cutoff voltage threshold of a first constant current operation in a step charging of the battery based at least in part on the determined impedance of the battery and the stored OCV. The method also includes causing a power source to provide a first constant current until the first cutoff voltage threshold is reached.

In Example 32, the method of Example 31 can optionally include determining a second cutoff voltage threshold of a second constant current operation in the step charging of the battery based at least in part on the determined impedance of the battery and the stored OCV. The method can also optionally include causing the power source to provide a second constant current until the second cutoff voltage threshold is reached.

In Example 33, the method of Example 31-32 can optionally include causing the power source to provide a constant voltage between the first constant current and the second constant current.

In Example 34, the method of Example 31-33 can optionally include holding the first cutoff voltage threshold until current delivered to the battery reaches the second constant current.

In Example 35, after a final cutoff voltage threshold has been reached in a set of constant current step operations the method of Example 31-34 can optionally include providing a constant voltage to the battery until a cutoff current threshold is reached.

In Example 36, the method of Example 31-35 can optionally include dynamically adjusting a constant current and a cutoff voltage threshold during step charging of the battery.

In Example 37, the method of Example 31-36 can optionally include sending messages over a bus to the power source that cause the power source to provide a constant current to the battery.

Example 38 is a method for adaptive charging. The method can include sensing measurements of a voltage of a rechargeable power source and estimating an open circuit voltage (OCV) of the rechargeable power source based at least in part on measurements from a sensor. The method can further include revising a current threshold based at least in part on the estimated OCV. The method can also include communicating with a charging system over a bus interface to dynamically adjust a constant current of a constant current source and to approximately maintain a current below the current threshold associated with an OCV to the rechargeable power source during a charging of the rechargeable power source.

In Example 39, the method of Example 38 can optionally include monitoring measurements from the sensor and keeping the estimate of the OCV updated based at least in part on the monitoring of the measurements. The method can further optionally include updating the current threshold when the estimated OCV exceeds an OCV threshold. The method can also optionally include communicating the updated current threshold to the charging system after the current threshold is updated.

In Example 40, the method of Example 38-39 can optionally include storing an undegraded OCV of an undegraded rechargeable power source at room temperature.

In Example 41, the method of Example 38-40 can optionally include storing an undegraded OCV of an undegraded rechargeable power source.

In Example 42, the method of Example 38-41 can optionally include charging the rechargeable power source of a portable computer, cell phone, tablet or drone.

In Example 43, after a final cutoff voltage threshold has been reached the method of Example 38-42 can optionally include providing a constant voltage to the rechargeable power source until a cutoff current threshold is reached.

Example 44 is a method of for adaptive charging. The method can include sensing a voltage of a rechargeable power source and monitoring measurements from the sensor. The method can further include keeping an estimate of the OCV updated based at least in part on the monitoring of the measurements. The method can also include updating a current threshold when the estimated OCV exceeds an OCV threshold. The method can further include communicating with the charging system over the bus interface to dynamically adjust a constant current of a constant current source and to approximately maintain a current below the current threshold associated with an estimated OCV to the rechargeable power source during a charging of the rechargeable power source.

Example 45 is an apparatus comprising means to perform a method as claimed in any of claims 20-44.

Example 46 is machine readable storage including machine-readable instructions that when executed implement a method or realize an apparatus as claimed in any of claims 20-44.

Example 47 is a device for charging a battery. The device can include storage configured to store an initial open circuit voltage (OCV) of a fully charged rechargeable power source. The device can further include a sensor configured to sense a voltage of the battery and a controller. The controller can be configured to determine a revised cutoff current threshold during constant voltage charge based at least in part on an indication that an OCV of a rechargeable power source has reached the initial OCV. The controller can further be configured to charge the rechargeable power source at a constant current until a cutoff voltage threshold is reached. The controller can also be configured to charge the rechargeable power source at a constant voltage until the revised cutoff current threshold is reached.

In Example 48, the device of Example 47 can optionally include a revised cutoff current threshold that is lower than a cutoff current threshold of a low-cycle count rechargeable power source at room temperature.

In Example 49, the controller of Example 47-48 can optionally be configured to count a number of cycles and retrieving a cutoff current threshold from a table that corresponds to the number of cycles In Example 50, the controller of Example 47-49 can optionally be configured to measure temperature and to retrieve a cutoff current threshold from a table that corresponds to the temperature.

In Example 51, the controller of Example 47-50 can optionally be configured to estimate an OCV of the rechargeable power source, determine an impedance of the rechargeable power source and calculate the revised cutoff current threshold based at least in part on the initial OCV.

Example 52 is a device for charging a battery. The device includes memory configured to store an initial charge time of a fully charged battery and a controller. The controller can be configured to determine a revised cutoff current threshold during constant voltage charge based at least in part on matching a charge time of the battery to the initial charge time. The controller can further be configured to cause the battery to charge at a constant current until a cutoff voltage threshold is reached. The controller can also be configured to cause the battery to charge at a constant voltage until the revised cutoff current threshold is reached.

In Example 53, the device of Example 52 can optionally include a revised cutoff current threshold that is lower than a cutoff current threshold of a low-cycle count battery at room temperature.

In Example 54, the controller of Example 52-53 can optionally be configured to transmit a first message to a charger to charge the battery at the constant current. The controller can further be configured to transmit a second message to the charger to charge the battery at the constant voltage.

In Example 55, the controller of Example 52-54 can optionally be configured to determine the revised cutoff current threshold based at least in part on battery temperature.

In Example 56, the controller of Example 52-55 can optionally be configured to measure a temperature and a number of cycles and retrieving a cutoff current threshold from a table that corresponds to the temperature and the number of cycles.

In Example 57, the controller of Example 52-56 can optionally be configured to determine the revised cutoff current threshold further comprises to measure an open circuit voltage (OCV).

Example 58 is a system for adaptive charging. The system can include a controller, a sensor configured to sense a voltage of a rechargeable power source, a bus interface between the controller and a charging system coupled to the rechargeable power source. The controller can be configured to monitor measurements from the sensor and keep an estimate of the OCV updated based at least in part on the monitoring of the measurements. The controller can further be configured to update a current threshold when the estimated OCV exceeds an OCV threshold. The controller can also be configured to communicate with the charging system over the bus interface to dynamically adjust a constant current of a constant current source and to approximately maintain a current below the current threshold associated with an estimated OCV to the rechargeable power source during a charging of the rechargeable power source.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A charging system for charging a battery comprising:
   memory configured to store an open circuit voltage (OCV) of a low-cycle count battery;
   a sensor configured to determine an impedance of the battery; and
   a controller configured to:
      determine a first cutoff voltage threshold of a first constant current operation in a step charging of the battery based at least in part on the determined impedance of the battery and the stored OCV; and
      cause a power source to provide a first constant current until the first cutoff voltage threshold is reached.

2. The charging system of claim 1, wherein the controller is further configured to:
- determine a second cutoff voltage threshold of a second constant current operation in the step charging of the battery based at least in part on the determined impedance of the battery and the stored OCV; and
- cause the power source to provide a second constant current until the second cutoff voltage threshold is reached.

3. The charging system of claim 2, wherein the controller is further configured to cause the power source to provide a constant voltage between the first constant current and the second constant current.

4. The charging system of claim 3, wherein to provide the constant voltage between the first constant current and the second constant current further comprises to hold the first cutoff voltage threshold until current delivered to the battery reaches the second constant current.

5. The charging system of claim 1, wherein after a final cutoff voltage threshold has been reached in a set of constant current step operations, the controller is further configured to provide a constant voltage to the battery until a cutoff current threshold is reached.

6. The charging system of claim 1, wherein the controller is further configured to dynamically adjust a constant current and a cutoff voltage threshold during step charging of the battery.

7. The charging system of claim 1, further comprising a bus between the power source and the controller configured to carry messages from the controller to the power source that cause the power source to provide a constant current to the battery.

8. The charging system of claim 1, wherein the battery is a lithium-ion (Li-ion) battery.

9. A system for adaptive charging comprising:
- a controller;
- a sensor configured to sense a voltage of a rechargeable power source;
- a bus interface between the controller and a charging system coupled to the rechargeable power source;
- the controller configured to:
  - receive measurements from the sensor;
  - estimate an open circuit voltage (OCV) of the rechargeable power source based at least in part on measurements from the sensor;
  - revise a current threshold based at least in part on the estimated OCV; and
  - communicate with the charging system over the bus interface to dynamically adjust a constant current of a constant current source and to approximately maintain a current below the current threshold associated with the estimated OCV to the rechargeable power source during a charging of the rechargeable power source.

10. The system of claim 9, wherein to receive measurements from the sensor further comprises to monitor measurements from the sensor;
- wherein to estimate the OCV of the rechargeable power source further comprises to keep the estimate of the OCV updated based at least in part on the monitoring of the measurements;
- wherein to revise the current threshold based at least in part on the estimated OCV further comprises to update the current threshold when the estimated OCV exceeds an OCV threshold;
- wherein to communicate with the charging system over the bus interface to dynamically adjust the constant current of the constant current source further comprises to communicate the updated current threshold to the charging system after the current threshold is updated.

11. The system of claim 9, further comprising memory to store an undegraded OCV of an undegraded rechargeable power source.

12. The system of claim 9, wherein the bus interface is a system management bus (SMBUS) or I2C interface.

13. The system of claim 12, further comprising the charging system.

14. The system of claim 13, further comprising a portable computer, cell phone, tablet or drone that comprises the charger.

15. The system of claim 9, wherein after a final cutoff voltage threshold has been reached, the controller is further configured to provide a constant voltage to the rechargeable power source until a cutoff current threshold is reached.

* * * * *